United States Patent
Qiu et al.

(10) Patent No.: US 12,406,041 B2
(45) Date of Patent: Sep. 2, 2025

(54) SYSTEM AND METHOD FOR CAPTURING NOTES ON A MOBILE DEVICE

(71) Applicant: QUALCOMM Incorporated, San Diego, CA (US)

(72) Inventors: Hong Qiu, Beijing (CN); Yiqing Cao, Beijing (CN); Michael Franco Taveira, San Diego, CA (US); Guomin Yang, Beijing (CN); Yang Yang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 18/007,474

(22) PCT Filed: Sep. 7, 2020

(86) PCT No.: PCT/CN2020/113671
§ 371 (c)(1),
(2) Date: Jan. 30, 2023

(87) PCT Pub. No.: WO2022/047762
PCT Pub. Date: Mar. 10, 2022

(65) Prior Publication Data
US 2023/0273983 A1 Aug. 31, 2023

(51) Int. Cl.
*G06F 21/00* (2013.01)
*G06F 3/04886* (2022.01)
(Continued)

(52) U.S. Cl.
CPC ........ *G06F 21/316* (2013.01); *G06F 3/04886* (2013.01); *G06F 21/629* (2013.01)

(58) Field of Classification Search
None
See application file for complete search history.

(56) References Cited

U.S. PATENT DOCUMENTS

| 10,887,338 B2 * | 1/2021 | Miller ................. H04L 63/1441 |
| 2012/0046012 A1 * | 2/2012 | Forutanpour ......... H04M 1/673 455/411 |

(Continued)

FOREIGN PATENT DOCUMENTS

| CN | 103176714 A | 6/2013 |
| CN | 103649892 A | 3/2014 |

(Continued)

OTHER PUBLICATIONS

International Search Report and Written Opinion—PCT/CN2020/113671—ISA/EPO—May 26, 2021.

(Continued)

*Primary Examiner* — Maung T Lwin
(74) *Attorney, Agent, or Firm* — Muncy, Geissler, Olds & Lowe, P.C.

(57) ABSTRACT

Methods and systems for capturing notes on a mobile device include displaying a lock screen on the electronic display of the mobile device and operating the mobile device in an active interaction state provides write-only to a secure file on the mobile device and that that provides write-only access to the secure file on the mobile device. The mobile device may render user inputs on top of the lock screen in a user input area on the mobile device display for a period of time, use the write-only access to store the user inputs in the secure file, and cease rendering the user inputs in response to detecting expiration of the period of time or in response to detecting user inactivity.

27 Claims, 20 Drawing Sheets

(51) Int. Cl.
    *G06F 21/31*     (2013.01)
    *G06F 21/62*     (2013.01)

(56) References Cited

U.S. PATENT DOCUMENTS

| | | | |
|---|---|---|---|
| 2012/0084734 | A1 | 4/2012 | Wilairat |
| 2012/0307126 | A1 | 12/2012 | Bhogal |
| 2013/0326582 | A1 | 12/2013 | Kruzeniski et al. |
| 2014/0223542 | A1 | 8/2014 | Hicks et al. |
| 2014/0273967 | A1 | 9/2014 | Kwon et al. |
| 2015/0082421 | A1* | 3/2015 | Flowers ............ G06F 21/88 726/16 |
| 2015/0160788 | A1 | 6/2015 | Sun et al. |
| 2016/0300045 | A1 | 10/2016 | Nyshadham et al. |
| 2016/0300048 | A1* | 10/2016 | Mason ............ G06F 21/31 |
| 2017/0124307 | A1* | 5/2017 | Reitsma ............ H04L 63/105 |
| 2019/0073347 | A1 | 3/2019 | Buckley et al. |
| 2019/0213344 | A1 | 7/2019 | Hesketh et al. |
| 2020/0004976 | A1 | 1/2020 | Li et al. |

FOREIGN PATENT DOCUMENTS

| | | |
|---|---|---|
| CN | 104052868 A | 9/2014 |
| CN | 106656962 A | 5/2017 |
| CN | 109165061 A | 1/2019 |
| CN | 109491570 A | 3/2019 |
| CN | 110633563 A | 12/2019 |
| CN | 111065996 A | 4/2020 |
| TW | 201333758 A | 8/2013 |
| TW | 201349078 A | 12/2013 |
| WO | 2017100014 A1 | 6/2017 |

OTHER PUBLICATIONS

Chen J., et al., "iPad2 300 Talent Practical Tips", China Youth Press, Dec. 31, 2011, 9 Pages.

Ning X., et al., "Network Album", 2002 Computer Application Essence, Yunnan Science and Technology Press, Apr. 30, 2002, 11 Pages.

Supplementary European Search Report—EP20952006—Search Authority—The Hague—May 14, 2024. 7 pages.

Hongyan P., et al., "Design and Implementation of Th-Notes Multi-Channel Shared Notebook System", Department of Computer Science, Tsinghua University, Beijing 100084, Center of Computer Research and Teaching, Tianjin TV University, Tianjin 300191, China, Jan. 26, 2007, 12 pages.

Yijun W., et al., "iPhone Brief History", (US) Brian McChet, Jan. 31, 2019, 5 pages.

Taiwan Search Report—TW110124380—TIPO—Feb. 10, 2025.

* cited by examiner

SYSTEM AND METHOD FOR CAPTURING NOTES ON A MOBILE DEVICE

BACKGROUND

Note taking has evolved from using writing instruments on a surface, like pen and paper, to modern computing devices that receive and communicate numerous kinds of data electronically. Smart phones and tablet computers are powerful mobile computing devices that have enabled many new kinds of note taking and communications. These mobile devices may also be used to store short notes and memos, such as mobile phone numbers, the names of books, action items (e.g., pick up tomatoes, etc., etc. Device users often acquire or conceive such information when the mobile device is in a screen-locked state and/or when the mobile device is busy processing other tasks or applications.

SUMMARY

Various aspects may include methods performed by a processor of a mobile device for capturing notes on the mobile device. Various aspects may include displaying a lock screen on the electronic display of the mobile device and operating the mobile device in a write-only interaction state that provides write-only access to a secure file on the mobile device and that enables a user to enter limited information that is stored in the secure file, rendering user inputs on top of the lock screen in a user input area for a period of time and using the write-only access to store the user inputs in the secure file, and ceasing receiving and rendering of the user inputs in response to expiration of the period of time or in response to detecting user inactivity. Some aspects may further include storing contents of the secure file in a note-taking application operating on the mobile device in response to the mobile device authenticating the user and exiting lock screen state. Some aspects may further include preventing the user from viewing, accessing, deleting, or editing the secure file until the mobile device authenticates the user.

Some aspects may further include monitoring sensors of the mobile device to determining whether a user has picked up or is otherwise attempting to interact with the mobile device while in a lock screen mode, and displaying a lock screen on the electronic display of the mobile device and operating the mobile device in a write-only interaction state in response to the mobile device determining that the user has picked up or is otherwise attempting to interact with the mobile device. Some aspects may further include rendering a keypad on the electronic display of the mobile device in response to determining that the user has picked up or is otherwise attempting to interact with the mobile device. In some aspects, rendering the user inputs on top of the lock screen in the user input area of the mobile device display for the period of time and using the write-only access to store the user inputs in the secure file may include rendering text inputs by the user on the rendered keypad at a location on lock screen first touched by the user.

Some aspects may further include storing in a single secure file the user inputs of limited information that are received by the mobile device in the write-only interaction state within a predefined duration, such as 24 hours. Some aspects may further include storing contents of a plurality of single secure files in a note-taking application operating on the mobile device, and autonomously organizing the plurality of single secure files locally on the mobile device or remotely via a cloud or communication network.

Some aspects may further include initiating user authentication operations (e.g., enter a password or biometric information, etc.) in response to determining that a number of user inputs satisfies (e.g., meets or exceeds) a threshold amount.

Further aspects may include capturing notes on a mobile device in response to a notification that appears on a screen or display. Such aspects may include detecting a presence of a notification on a screen presented on a display of the mobile device, enabling a write-on-notification functionality of the mobile device, receiving user inputs associated with the notification, saving the received user inputs in a file, and providing a mobile device user access to the saved file. In some aspects, saving the received user inputs in a file may include saving the received user inputs to one or more of a file associated with the notification or an application associated with the application, a file that can be accessed by an email application when the announcement was a banner indicating that an email was received, a file that is accessible in a calendar application when the notification is generated by the calendar application, or a note-taking file, clipboard, or other file in response when the announcement is associated with an application or functionality that does not receive user inputs, in some aspects, providing a mobile device user access to the saved file associated with the notification may include providing the mobile device user access to the saved file in response to one or more of activation of an application associated with the notification, upon activation of a note-taking or word processor application, authentication of the user, unlocking of the mobile device, or presentation of a particular screen on a display.

Various aspects may include a mobile device (having a memory storing processor-executable instructions and a processor configured to execute the processor-executable instructions to perform operations of any of the methods summarized above. Various aspects include a processor for use in a mobile device, the processor having memory and configured to perform operations of any of the methods summarized above. Various aspects may include a mobile device having various means to perform the functions of the methods summarized above.

BRIEF DESCRIPTION OF THE DRAWINGS

The accompanying drawings, which are incorporated herein and constitute part of this specification, illustrate example aspects of various embodiments, and together with the general description given above and the detailed description given below, serve to explain the features of the claims.

DETAILED DESCRIPTION

Figure 1:
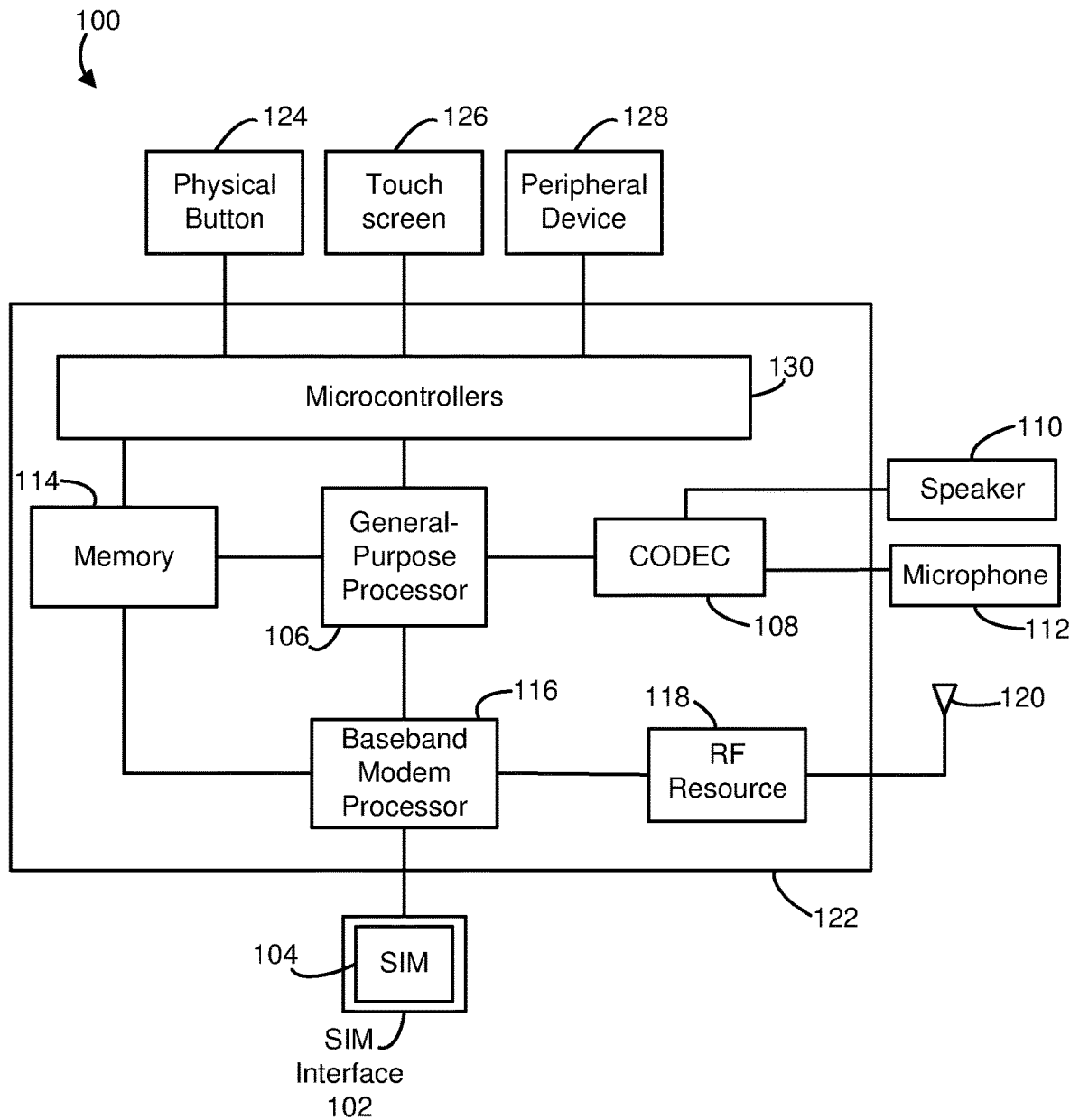
FIG. 1 is a component block diagram illustrating an example mobile device suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods and mobile devices implementing such methods that enable entering brief notes without unlocking or accessing full functionality of the device, providing a handy note-taking functionality without compromising device or data security. For example, in some embodiments, upon power-up or after a period of user inactivity, a mobile device may enter screen-locked state and/or display a lock screen, and operate in a write-only interaction state that provides write-only access to a note-saving file on the mobile device and/or that enables a user to enter limited information that is stored in the note-saving file. In some embodiments, the write-only interaction state may activate an instant type function or render a soft keyboard in response to various user inputs, actions or conditions on the mobile device. The mobile device may capture and render user inputs (e.g., inputs received via the soft keyboard or other means) on top of the lock screen in a user input area for a period of time, and use the write-only access to store the user inputs in the note-saving file. The mobile device may cease receiving and rendering the user inputs and/or cease writing to the note-saving file in response to expiration of the period of time or in response to detecting user inactivity (e.g., detecting no input within a predefined interval). The mobile device may store the file in a more permanent file that is only accessible when the user is authenticated and the mobile device exits the screen-locked state (or other screens or states as described herein).

The term, "mobile device" is used herein to refer to any of a variety of personal, portable or wireless computing devices including smartphones, tablets, laptops, personal or mobile multi-media players, personal data assistants (PDA's), laptop computers, tablet computers, ultrabooks, palm-top computers, wireless electronic mail receivers, multimedia Internet enabled cellular telephones, and similar electronic devices which include a programmable processor, a memory, a display and user interface capabilities. Wireless communication devices are also commonly referred to as user equipment (UE), mobile devices, and cellular devices. Mobile devices may receive and/or transmit communications via a variety of wired and/or wireless communication networks, including wide area networks (e.g., mobile communication networks), local area networks (e.g., Wi-Fi, Bluetooth, etc.), geolocation networks (e.g., Global Positioning System ("GPS")), personal area networks (e.g., Wireless USB, Bluetooth, ZigBee, etc.), near-field communication, etc.

A mobile device may operate in a screen-locked state or an unlocked state. The screen-locked state may regulate immediate access to the mobile device by requiring that the user perform a certain action before accessing certain features of the mobile device. The user may access the note-taking features of the mobile device after the mobile device transitions from the screen-locked state to one of a number of unlocked states.

In various operating modes or states, a mobile device may render various different screens of a display, including a blank screen, an application screen, a home screen, a lock screen, and an unlock screen. In various embodiments, the lock screen and unlock screen may essentially provide the same or similar views except that the former is in a locked state and the latter is in an unlocked state (e.g., in response to authenticating the user). In some embodiments, the unlock screen may provide different information or views than the lock screen. For instance, an email notification may only display that one or more emails has arrived while on in the locked state, but may provide more details (e.g., at least part of the email message, sender, etc.) in the unlocked state.

An application screen may include the graphical user interface (GUI) of a software application operating on the device, and typically occupies all or a large portion of the mobile device's display. The home screen may be the main screen of the mobile device, displaying virtual buttons and icons that link to different software applications, notifications, settings, and/or features of the device. The home screen may also encompass any screen that is not an application full screen, lock screen or unlock screen. For example, a home screen may encompass a settings screen, overlay screen, an application screen that covers only a portion of the available display area, etc. Combination screens are also possible in some circumstances or operating moves, such as when a pop-up message or interface is rendered on top of another screen (e.g., home screen, application screen, blank screen, etc.).

A lock screen may render user interface elements that require that a user perform a certain action before accessing certain features of the mobile device. For example, the lock screen may require that a user perform a gesture on device's touchscreen (e.g., sliding a virtual button, etc.), enter a password or pin, draw a pattern, touch a fingerprint reader, or look into the device's camera (e.g., face unlock, etc.) before using the device. The lock screen may also display an overview screen with (but not limited to) the current date and time, device status information (e.g., battery status, connectivity information, etc.), weather, recent notifications from one or more applications, contact information of the device's owner (for use in the event that the device is lost or stolen, during a medical emergency, etc.) and other similar information. In addition, the lock screen may display playback controls for media and shortcuts to select applications (e.g., a camera app, etc.).

A lock-to-unlock transition screen may be a transitional screen that is displayed on the mobile device after the user has been authorized to use the device but before the mobile device has fully transitioned from a screen-locked state to an unlocked state. For example, a lock-to-unlock transition screen may render the user interface elements of its corresponding lock screen but change the rendering of a closed lock to an open lock. In such case, the unlock screen (or state) may remain at the same screen (but may provide different information). In other cases, unlocking the device may cause the device to switch from the lock screen to any other screen, such as the home screen or an application screen.

In various embodiments, an unlocked screen may be considered any screen that is not a lock screen. For example, the application screen and home screen may be unlocked screens.

A blank screen may be a screen displayed by the mobile device when the device is idle, not being used, sleeping, or in a lower-power mode. The blank screen may be an active rendering or may be a result of the mobile device powering-off all or portions of its electronic display system. In some embodiments, the electronic display system may be in a reduced power mode in which the screen is blank, but writing on the screen can be detected b the screen. Thus, the reduced-power mode is a power mode that uses more power than a low-power mode in which the screen is blank (e.g., off) and writing detection is off in various embodiments, a mobile device may transition from the blank screen to another screen (e.g., the lock screen) in response to the mobile device detecting a user interaction with the device or in response to detecting that the mobile device has been moved (e.g., has been picked up, etc.).

For ease of reference, some of the embodiments below are discussed with reference to the lock screen and screen-locked state. However, it should be understood that any or all of embodiments discussed in this application may be practiced on any or all of the screens and states discussed in this application, including the home screen (unlocked state), the application screen (unlocked state), the lock-to-unlock transition screen (locked or unlocked state), and the blank screen (locked or unlocked state). For example, some embodiments may allow notes to be taken on a blank screen such that the user inputs are captured but not rendered immediately, thereby allowing a user to take notes discreetly or unobtrusively (e.g., in a dark room, movie theatre, etc.). As another example, some embodiments allow notes to be taken on an application screen such that the user inputs do not affect and are not stored in association with the underlying software application. This allows, for example, a user watching a video via a video streaming application to input notes directly on top of the video display, and for the notes to be stored independent of the video streaming application (e.g., without the video streaming application recording the notes, etc.).

A mobile device may be configured to provide note-taking functionality for making notes (e.g., text notes, drawings, audio recordings, video recordings, photos, etc.), which may be implemented in firmware, operating system functionality and/or in an application executing on the mobile device in some embodiments, the notes may be synchronized between devices and/or used by other applications operating on the mobile device. A mobile device user may use the note-taking features (e.g., a note-taking application, etc.) to store small notes and memos, such as mobile phone numbers, the names of books, action items (e.g., pick up tomatoes, etc.), etc.

A conventional process or procedure for using a mobile device's note-taking application to store a note may include inputting a password or biometric information on the lock screen to unlock the mobile device, interrupting the current execution of tasks or background processes on the mobile, locating the note-taking application via the mobile device's operating system interface, launching the note-taking application on the device, waiting for the note-taking application to load, creating or selecting a notes file in which to store the notes, and entering newly acquired/conceived information as a short note or memo. These operations are tedious and time consuming, and because device users often acquire or conceive of the note information (e.g., phone numbers, addresses, etc.) when the mobile device is in a screen-locked state or when the mobile device is busy processing other tasks or applications, users often forgo using conventional note-taking applications to store quick notes or memos on their mobile device.

Various embodiments overcome the above-described limitations of conventional solutions to enable mobile device users to store quick notes or memos on their mobile device. In some embodiments, a mobile device may be configured to operate in write-only interaction state (which may also be referred to as an instant pen mode, single file writing only mode, etc.) that that allows the device user to quickly capture, record, or store a small amount of information on the lock screen without first unlocking the phone, finding and launching the note-taking application, or any of the other tedious, time consuming or potentially distracting actions, operations or tasks of the conventional solutions discussed above.

In some embodiments, the mobile device may be configured to operate in the write-only interaction state when mobile device is in the screen-locked state. While operating in the write-only interaction state, the mobile device may monitor the lock screen for user inputs (e.g., text, voice, etc.) and/or provide the user with "write-only" permissions to a secure file and/or to limited functions of the note-taking application. The mobile device may display and capture the user inputs that are received within a short period of time (e.g., 10 seconds, 30 seconds, 1 minute, etc.). In some embodiments, the mobile device may store the user inputs in real time (or near real time) as the inputs are captured. In some embodiments, upon detecting inactivity or expiration of the time period, the mobile device may cease displaying the user inputs and/or store the captured inputs in a file. Such a note-saving file may be a single, small isolated, and/or secured file that is relatively limited in size. The mobile device may prevent the user (or other users) from viewing, accessing, deleting, or editing the file while the device remains in the screen-locked state (or another screen state). The mobile device may store the file in the note-taking application (or other suitable location) or in a more permanent file that is only accessible when the user is authenticated and the mobile device exits the screen-locked state (or another screen state as described).

In some embodiments, the mobile device may be configured to implement an instant type function. The mobile device may activate the instant type function in response to detecting that a user has commenced typing on a connected keyboard (e.g., a Bluetooth® keyboard, etc.) or on a soft keyboard rendered on the electronic display of the mobile device. The mobile device may also activate the instant type function, or render a soft keyboard suitable for activating the instant type function, in response to various inputs, actions or conditions on the mobile device. For example, the mobile device may be configured to activate the instant type function and/or render a soft keyboard in response to determining (e.g. based on gyroscope measurements, etc.) that the mobile device is raised by the user. In some embodiments, the mobile device may be configured to activate the instant type function and/or render a soft keyboard in response to detecting a touch on a display screen or button of the mobile device. In some embodiments, the mobile device may be configured to activate the instant type function and/or render a soft keyboard in response to detecting actuation of an on-screen control (e.g., a button press, a slide-in window input, etc.). In some embodiments, the mobile device may be configured to activate the instant type function and/or render a soft keyboard in response to receiving activation information from an associated device (e.g., smart watch).

In some embodiments, the mobile device may be configured to perform operations to authenticate the user while the mobile device operates in the write-only interaction state. For example, the mobile device may display a lock screen and operate in the write-only interaction state, commence rendering user inputs on top of the lock screen in a user input area for a period of time, use the write-only access to store the user inputs in the secure file, perform facial recognition operations (or other similar operations) to authenticate the user while the user continues to prove inputs, unlock the mobile device based on the user authentication, and continue rendering user inputs on top of the lock screen or one top of a subsequent screen for a period of time or until the user ceases inputting information or becomes inactive. The mobile device may store in a single secure file the user inputs of limited information that are received by the mobile device in the write-only interaction state within a predefined duration.

In some instances, a mobile device may be in a screen-locked state and unlocked. For example, on some devices (e.g., iPad, iPhone, etc.), the mobile device may authenticate the user, change the rendering of closed lock to an open lock, and continue to display the lock screen (or a lock-to-unlock transition screen) until the user performs an appropriate input gesture (e.g., swiping up, left or right. A mobile device configured in accordance with various embodiments may enable a user to write on the lock-to-unlock transition screen prior to the user performing the appropriate input gesture (e.g., swiping up, left or right to enter the home screen). In some embodiments, the mobile device may be configured to support advanced note-taking features, such as (but not limited to) jumping to the note-taking application or generating a note pop-up graphical user interface (GUI), when the device is in a screen-locked state and unlocked (e.g., when the user has been authenticated but has not yet performed the appropriate input gesture (e.g., swiping up, left or right). That is, when the device is in a screen-locked state and unlocked, additional features may be available that may not be available when the device is in a screen-locked state and locked.

In some embodiments, the mobile device may utilize a single note-taking application while the mobile device operates in the write-only interaction state. In some embodiments, the mobile device may utilize multiple different note-taking applications while the mobile device operates in the write-only interaction state. In some embodiments, the mobile device may be configured to dynamically determine or select a note-taking application from a plurality of note-taking applications, and use the selected note-taking application to capture or store notes.

In some embodiments, the mobile device may be configured to determine or select a note-taking application based on user inputs or preferences. For example, the mobile device may be configured to render a dialog, input box or otherwise allow the user to select a note-taking application from a plurality of note-taking applications. In some embodiments, the mobile device may allow the user to select a note-taking application before or during the performance of the note-taking operations (e.g. capturing, rendering or storing the user inputs).

In some embodiments, the mobile device may be configured to determine or select a note-taking application based on context. For example, using various sensors (e.g., navigation sensors, motion sensors, a camera for light sensing, a microphone, a clock, etc.), the processor of the mobile device may determine a location of the device, activities in the vicinities, activities of the user, and other elements of context relevant to whether the note-taking application should be activated. As a non-limiting example, if accelerometer data indicates that the user is walking or standing while carrying the mobile device, the processor may determine from this context that the note-taking feature should be activated because the user is unlikely to be typing an email or writing a document in such circumstances.

In some embodiments, the mobile device may be configured to determine or select the note-taking application based on the types of inputs received from the user. For example, the mobile device may select a first note-taking application (app 1) in response to determining that the user inputs are text inputs received on the keypad, select another note-taking application (app 2) in response to determining that the user inputs are character shapes received as the user writes freehand on the device, and to select yet another note-taking application (app 3) in response to determining that the user inputs are audio recordings or voice inputs received via the microphone.

In some embodiments, the mobile device may be configured to determine whether inputs received in a note-saving input box (e.g., on the lock screen, in an "insta-pen" mode, etc.) were inputted using a stylus. The mobile device may identify the stylus based on a current Bluetooth connection, receipt of a stylus ID, or other techniques known in the art, and determine or select a note-taking application based on the identified stylus or stylus type. For example, the mobile device may select a first note-taking application (app 1) in response to determining the user is writing with a first stylus (stylus ID=1), and select another note-taking application (app 2) in response to determining the user is writing with another stylus (stylus ID=2).

In some embodiments, the mobile device may be configured to determine or select a note-taking application based on the user actuating a button, such as a soft button on screen, a physical button on the device, physical/soft button on a related device (e.g., paired stylus, smart watch, etc.), etc. For example, the mobile device may select a first note-taking application (app 1) in response to determining that a button has not been actuated, and select another note-taking application (app 2) in response to detecting actuation of the button.

In some embodiments, the mobile device may be configured to determine or select a note-taking application based on a user ID associated with the current user of the mobile device. For example, the mobile device may identify the current user of the mobile device, and select the note-taking application (e.g., app 1 or app 2) based on the identified user or user ID.

In some embodiments, the mobile device may be configured to determine or select a note-taking application based on the current location of the mobile device. For example, the mobile device may select a first note-taking application (app 1) in response to determining that the mobile device is in a first location (e.g., home, etc.), and select another note-taking application (app 2) in response to determining that the mobile device is in another location (e.g., work, movie theater, automobile, etc.).

In some embodiments, the mobile device may be configured to determine or select a note-taking application based on the current date or time of day in some embodiments, the mobile device may be configured to determine or select a note-taking application based on a user's calendar in combination with the current date and/or time of day, such as when the current day/time correspond to a scheduled meeting or event in which use of the mobile device will be limited (e.g., in a meeting, in a gym, at a party, etc.).

In some embodiments, the mobile device may be configured to determine or select a note-taking application based on an operating state of the mobile device. For example, the mobile device may select a first note-taking application (app 1) in response to determining that the mobile device is in a screen-locked state, and select another note-taking application (app 2) in response to determining that the mobile device is not in the screen-locked state. As another example, the mobile device may select a first note-taking application (app 1) in response to determining that the mobile device is locked, and select another note-taking application (app 2) in response to determining that the mobile device is unlocked (authenticated).

In some embodiments, the mobile device may be configured to determine or select a note-taking application based on the position on the screen on which user inputs are detected and/or based on the location on the display where the note-saving input box is rendered. For example, the mobile device may select a first note-taking application (app 1) in response to determining that the user is writing in a first section of the screen (e.g., top half of the screen, top right of the screen, etc.), and select another note-taking application (app 2) in response to determining that the user is writing in a second section of the screen (e.g., bottom half of the screen, bottom right of the screen, top left of the screen, etc.). As another example, the mobile device may select a first note-taking application (app 1) in response to determining that the user is writing on a notification or widget of a first software application, and select another note-taking application (app 2) in response to determining that the user is writing on a notification or widget of a second software application.

In some embodiments, the mobile device may be configured to store the captured inputs in a note-saving file, and to store the note-saving file in the note-taking application (or other suitable location) or in a more permanent file that is only accessible when the user is authenticated and the mobile device is not on the current screen or in a screen-locked state. In some embodiments, the mobile device may store the note-saving file in association with an application (e.g., note-taking application). In some embodiments, the mobile device may store the note-saving file in memory without association with an application, and at later point in time (e.g., when user unlocks device, user views and organizes files, etc.), associate the stored note-saving file with the application.

In some embodiments, the mobile device may be configured to request that the user preform authentication operations (e.g., enter a password or biometric information, etc.) to exit the lock screen (or unlock the device) in response to determining that the user inputs exceed a threshold size (e.g., file size, number of characters, etc.) and/or in response to determining that a time period allowed for using the write-only interaction state has expired.

In some embodiments, the mobile device may be configured to provide autonomous organization of the notes/files locally on the device and/or remotely via a cloud or communication network. In some embodiments, the mobile device may be configured to autonomously organize the notes/files based on word recognition and/or language context.

In some embodiments, the mobile device may be configured to populate and store the note-saving file in a memory of the mobile device without authenticating the user to the mobile device.

In some embodiments, the mobile device may be configured to not render or display the contents of the note-saving file after it is stored in memory.

In some embodiments, the mobile device may be configured to store all the notes/inputs received within a predefined duration (e.g., 20 seconds, etc.) in the same note-saving file.

In some embodiments, the mobile device may be configured to automatically name the note-saving file.

In some embodiments, the note-saving file may be a database file and/or the mobile device may be configured to used database technologies or techniques to create or store the note-saving file.

In some embodiments, the mobile device may be configured to store all the notes or received inputs in a single note-saving file.

In some embodiments, the mobile device may be configured to store each note in conjunction with a time stamp and/or location information.

In some embodiments, the mobile device may be configured to determine and compare the number of input characters received for a note or within a predefined duration (e.g., 20 seconds, etc.) to all input threshold value. The mobile device may be configured to trigger an authentication procedure (e.g., request that the user input a password or biometric information on the lock screen to unlock the mobile device) in response to determining that the number of input characters satisfies (e.g., meets or exceeds) the input threshold value.

In some embodiments, the mobile device may be configured to automatically delete the note-saving file in response to detecting the presence or absence of a particular condition. For example, in some embodiments, the mobile device may be configured to automatically delete the note-saving file in response to determining that the mobile device has not been unlocked for a certain time (e.g., to prevent/ignore false inputs or notes from people who don't have access to device). In some embodiments, the mobile device may be configured to automatically delete the note-saving file in response to determining that the notes have not been acted upon, such as if user doesn't bother to categorize the notes after device is unlocked, then notes may not be sufficiently important to store.

In some embodiments, the mobile device may be configured to render a view of the note-saving files when the user launches the note-taking application and/or when the device is operating in a normal, full, or unlocked operating mode in which the lock screen is no longer displayed. The view of the note-saving files may include a listing or the note-saving files, the contents of a note-saving file, etc. The view may group the note-saving files by date, time, location, length, relevance, etc. In some embodiments, the view may be configured by the user and/or based on user preferences in some embodiments, the mobile device may generate or render the view of the note-saving files remotely or locally on the device. The view may be generated locally by default, and the user may have the option to generate the view remotely.

In some embodiments, the mobile device may be configured to convert the contents of an audio-based note-saving file to a text file, and vice versa. In some embodiments, the mobile device may be configured to convert written material to text. In some embodiments, the mobile device may be configured to perform the conversions (e.g., from an audio-based note-saving file to a text file, from written material to text, etc.) after the mobile device enters an unlocked state. For example, the mobile device may be configured to store raw inputs (e.g., raw audio or text, etc.) while the device is locked and operating in the write-only interaction state, and to convert the stored raw inputs (e.g., to text, etc.) in response to determining that the device has transitioned from the locked state to an unlocked state. In some embodiments, the mobile device may perform the conversions while the device is locked or in a screen-locked state (i.e., the converted material is stored, not the raw input data). In some embodiments, the mobile device may be configured to store the raw inputs, the conversions, or both the raw inputs and their conversions in memory while the device operates a locked or unlocked state.

In some embodiments, the mobile device may be configured to automatically organize, classify, name, provide descriptive information, combine, etc. of the note-saving files (e.g., by date, time, location, filename, length, relevance, priority, etc.).

In some embodiments, the mobile device may be configured to generate and/or organize the note-saving files so that each note-saving file is an action item (e.g., all hook names, etc.).

In some embodiments, the mobile device may be configured to associate or apply different categories or principles to each note-saving file.

In some embodiments, the mobile device may be configured to send the note-saving files to a cloud server for further processing and/or organization.

In some embodiments, the mobile device may be configured to render the note-saving input box on the lock screen after detecting user activity. In some embodiments, the mobile device may cease rendering the note-saving input box after detecting inactivity (e.g., upon detecting a set amount of inactivity). In some embodiments, the mobile device may cease rendering the note-saving input box after expiration of a time period, such as after a set amount of time from the start of the input.

In some embodiments, the mobile device may be configured to always render the note-saving input box on the lock screen.

In some embodiments, the mobile device may be configured to render the note-saving input box on the locked-screen or on any other screen (e.g., when the device is unlocked and the user is using other applications on the device, etc.) in response to detecting a special finger gesture.

In some embodiments, the mobile device may be configured to fade out or cease displaying earlier inputs as the user continues to provide inputs and/or as time progresses. For example, in some embodiments, the mobile device may render user inputted text such that only the most recently entered words or characters (e.g., characters entered in the past 2, 5, 10, or 15 seconds) are displayed in the note-saving input box, with the earlier inputted character fading to be illegible or invisible. In some embodiments, the mobile device may render user inputted text such that only a certain number of characters (e.g., 5, 10, 15, etc. characters) are displayed in the note-saving input box, with the oldest inputted characters fading and/or disappearing as the user adds new characters. In some embodiments, the mobile device may render user inputted text such that only a certain amount of screen space is consumed, with earlier inputs fading or disappearing off an edge of the screen space as the user provides additional inputs that consume more space on the screen. For instance, if the user jots down 4 lines of notes, the first line may fade as the third line is entered. Thus, the user may only see the last N number of lines, or maybe just the current line.

In some embodiments, the mobile device may display and capture the user inputs that are received within a short period of time (e.g., 10 seconds, 30 seconds, 1 minute, etc.). In some embodiments, the number of characters/words, the amount of time in which the characters/words are displayed, and/or the amount of space that the displayed characters occupy may be user configurable.

In some embodiments, the mobile device may be configured to sort the note-saving files as recorders in a chronological order in a database file.

In some embodiments, the mobile device may be configured to determine and add time and location for each note-saving file to facilitate automatic further processing of the notes.

In some embodiments, the mobile device may be configured to grouped the note-saving files according to time (e.g., date, time, etc.) and present the user the view of a file list with each file numbered with date.

In some embodiments, the mobile device may be configured to group the note-saving files together. The mobile device may further expand grouped notes so that the note record may be presented to the user for reading and for further processing.

In some embodiments, the mobile device may be configured to complement the note-saving files, either locally or remotely. For example, when operating in the function mode of various embodiments, the mobile device may identify note records that include only a few words and/or that do not describe a complete meaning, and provide the user with options for complementing those notes, such as by adding words, punctuation, etc.

In some embodiments, the mobile device may be configured to store each note or each group of received inputs (e.g., inputs received within the predefined duration) in a separate note-saving file. In these embodiments, each note or note-saving file may be provided with a time and/or date description in the filename and/or title of note-saving file. For example, the mobile device may generate the filename "1212201301.txt" for a note created Dec. 12, 2020 at 1:01 PM. Alternatively or additionally, the mobile device may generate the note-saving files to include metadata or a title that includes a time and/or date description (e.g., "Note from 12/12/20 1:01 pm").

In some embodiments, the mobile device may be configured to provide the user with periodic reminders to save or otherwise act on notes (e.g., save, edit, categorize, ignore, etc.). The mobile may render the reminders on the locked-screen or on any other screen (e.g., when the device is unlocked, the user is using other applications, etc.).

In some embodiments, the mobile device may be configured to operate in a "whiteboard" mode. The mobile device may determine whether inputs received in a note-saving input box (e.g., on the lock screen, in an "instar-pen" mode, etc.) were inputted using a stylus/finger. The mobile device may store non-text inputs from the stylus/finger as writing or converted to text. For example, the mobile device may convert shapes drawn on the lock screen to letters. The mobile device may perform the conversion in the screen-locked state, or after the device is unlocked (e.g., the inputs may be saved in screen-locked state and converted later).

In some embodiments, the mobile device may be configured so that the notes that are written on device are saved by pressing a save button (e.g., soft button on screen, a physical button on device, physical/soft button on a related device (e.g., paired stylus, smart watch, etc.), etc.). In some embodiments, the mobile device may be configured so the notes that are being written on device are saved by locking the device (e.g., pressing button that would lock the device even if the device is already locked), based on an inactivity timer since the note was last written, periodically (auto save feature), etc.

In some embodiments, the mobile device may be configured to support multiple users by distinguishing between notes/inputs from different users and switching user profiles.

For example, the mobile device may be associate inputs received from a first stylus with one user, and the inputs received form a second stylus switch another user. The mobile device may switch user profiles based on the stylus used in some embodiments, the mobile device may be configured to switch user profiles based on the actuation of a selection button included on stylus, mobile device, or on another device communicatively coupled to the mobile device. In some embodiments, the mobile device may be configured to differentiate between users based on biometrics (e.g., facial recognition, fingerprint, etc.), via the stylus, via smart watch/'ring, or other methods conventionally used to authenticate a user. In some embodiments, the mobile device may be configured to classify a user as an unknown user, create a profile for the unknown user, and/or switch to an unknown user profile (e.g., when user authentication fails, etc.).

In some embodiments, the mobile device may be configured to differentiate between users based on writing style (e.g., hand-writing or character recognition) or any other way to known in the art for determining between first user profile and a second user profile (or an unknown user profile).

Various embodiments improve the security, privacy, performance, and/or functioning of the mobile device. For example, by only allowing the user to input a limited amount of information while the device the locked, the embodiments prevent hackers or other nefarious actors from inputting a large amount of information that consumes a significant amount of the device's memory resources and/or which has a negative impact on other background applications operating on the device. By storing the information in an isolated and secure file, various embodiments prevent hackers or other nefarious actors from injecting malware or inputting information (e.g. a Uniform Resource Locator (URL) to a website with a virus, etc.) that could harm the mobile device. By preventing a user that is entering a note from accessing previously recorded notes or data from other applications, the embodiments improve the privacy and functionality of the mobile device.

FIG. 1 illustrates components of a mobile device 100 that is suitable for implementing various embodiments. In the example illustrated in FIG. 1, the mobile device 100 include a subscriber identity module (SIM) interface 102, an identity module SIM 104, a general-purpose processor 106 (e.g., a central processing unit ("CPU")), a coder/decoder (CODEC) 108, a speaker 110, a microphone 112, memory 114, a baseband modem processor 116, a radio frequency (RF) resource 118, antennas 120, a system-on-chip (SOC) 122, a physical button 124, a touchscreen display 126, peripheral devices 128 (e.g., camera, etc.), and various controllers/microcontrollers 130 in some embodiments, the general-purpose processor 106, memory 114, baseband processor(s) 116, and RF resource 118 may be included in the SOC 122. In some embodiments, the SIM 104 and its corresponding interfaces 102 may be external to the SOC 122.

In some embodiments, the mobile device 100 may further include a graphics processor unit (GPU), a modem digital signal processor (DSP), an application processor unit (APU), and/or other specialized processors or hardware accelerators (not shown). Any or all of the processors in the mobile device 100 may include one or more homogeneous or heterogeneous processor cores. The homogeneous processor cores may be cores that are configured for the same purpose and/or have the same or similar performance characteristics. Heterogeneous processor cores may be cores that are configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores.

The SIM interface 102 may configured to receive an identity module SIM 104 that is associated with a subscription to a mobile telephony network. In some embodiments, the mobile device 100 may be a multi-subscription mobile device that includes additional SIM interfaces, each of which may receive an additional identity module SIM associated with other subscriptions and/or other mobile telephony networks.

The general-purpose processor 106 may be coupled to the CODEC 108, which may be coupled to a speaker 110 and a microphone 112. The general-purpose processor 106 may also be coupled to at least one memory 114. The memory 114 may be a non-transitory computer readable storage medium that stores processor-executable instructions. The memory 114 may also store operating system (OS) software, application data, user application, software and/or executable instructions, including instructions configured to cause a processor to perform operations of various embodiments.

The baseband modem processor 116 may be an integrated chip capable of managing the protocol stacks of the SIMs 104 or subscriptions and implementing a co-existence manager software.

The RF resource 118 may include communication circuits or transceivers that perform transmit/receive functions for the associated SIM 104 of the mobile device 100. The RF resource 118 may include communication circuits that include separate transmit and receive circuitry, or may include a transceiver that combines transmitter and receiver functions. The RF resource 118 may be configured to support multiple radio access technologies/wireless networks that operate according to different wireless communication protocols. The RF resource 118 may include or provide connections to different sets of amplifiers, digital to analog converters, analog to digital converters, filters, voltage-controlled oscillators, etc. Multiple antennas 120 and/or receive blocks may be coupled to the RF resource 118 to facilitate multimode communication with various combinations of antenna and receiver/transmitter frequencies and protocols (e.g., LTE, Wi-Fi, Bluetooth, near-field communication, and/or the like). The RF resources 118 may also be coupled to the baseband modem processor 116.

The mobile device 100 may be configured to operate within a variety of communication systems, such as mobile telephony networks. The mobile device 100 may communicate with a mobile telephony network via a cellular connection to a base station of the mobile telephony network. The cellular connection may be made through two-way wireless communication links using a variety of communication technologies, such as Long Term Evolution (LTE), fifth generation (5G), fourth generation (4G), third generation (3G), Code Division Multiple Access (CDMA), Time Division Synchronous Code Division Multiple Access (TD-SCDMA), Wideband Code Division Multiple Access (WCDMA), Global System for Mobile communication (GSM), and other mobile telephony communication technologies. Other connections may include various other wireless connections, including WLANs, such as Wi-Fi based on Institute of Electrical and Electronics Engineers (IEEE) 802.11 standards, and wireless location services, such as the Global Positioning System (GPS); WPANs, such as Wireless USB, Bluetooth, and ZigBee; and/or near-field communication.

Figure 2:
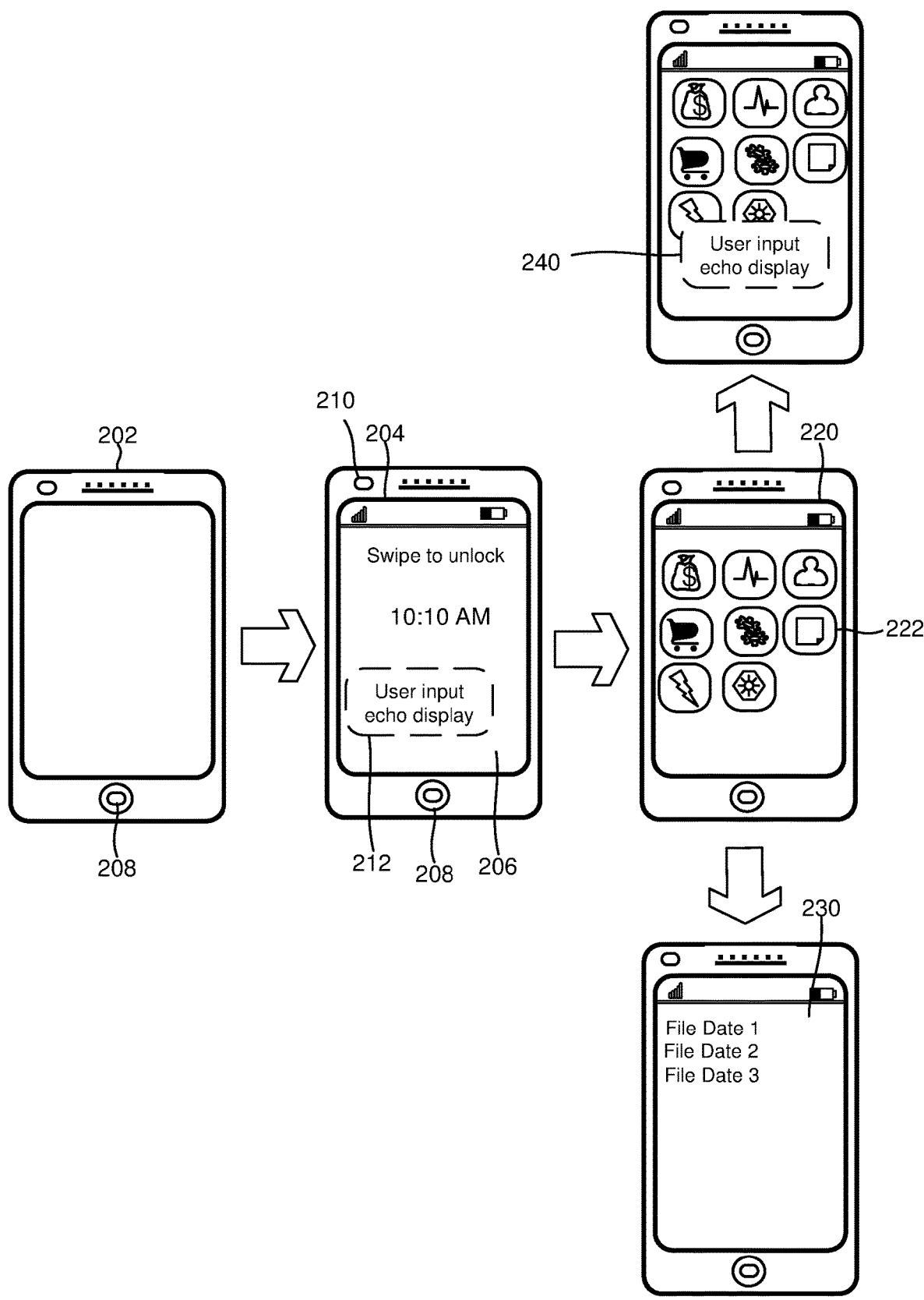
FIG. 2 is a component diagram illustrating various interface screens, operating modes, and operations in a mobile device configured to capturing notes in accordance with some embodiments.

FIG. 2 illustrates various interface screens, operating modes, and operations in a mobile device 202 (e.g., the mobile device 100 illustrated in FIG. 1, etc.) configured to operate in the write-only interaction state in accordance with various embodiments. With reference to FIGS. 1 and 2, the mobile device 202 may include a fingerprint scanner 208 configured to detect fingerprint features of the user in response to the user engaging a finger on the fingerprint scanner 208 while the user is holding the mobile device 202. Alternatively or additionally, the mobile device 202 may include a camera 210 and/or other sensors configured to detect and evaluate facial features of the user in response to the user moving or engaging the mobile device 202, and which may be used for authenticating the user based on facial recognition.

In some embodiments, a processor in the mobile device 202 (e.g., general purpose processor 106, etc.) may be configured to authenticate the user by receiving data representing the facial or fingerprint features of the user, comparing these features to biometric information stored in memory (e.g., memory 114) and/or transmitting the data representing the features to a remote computing device for analysis. The mobile device 202 may be configured to enter an unlocked state in response to determining that the detected features match the biometric information stored in memory or in response to receiving an indication from the remote computing device that the data representing the features was accepted for unlocking the mobile device 202.

In various embodiments, the mobile device 202 may be configured to authenticate the user before, during or after entering the write-only interaction state. In some embodiments, the mobile device 202 may be configured to authenticate the user in-screen. For example, the mobile device may be configured to collect fingerprint information from the user while the user types or writes notes on the screen. The mobile device may authenticate the user based on the collected in-screen fingerprint information.

In some embodiments, the mobile device 202 may be configured to transition from a lock screen to the application screen of the note-taking application. For example, the mobile device 202 may render a lock screen, enter the write-only interaction state, and commence capturing and rendering user inputs on top of the lock screen in the user input area. The mobile device may authenticate the user (e.g., based on collected in screen fingerprint information, etc.) while continuing to capture and render user inputs on top of the lock screen in the user input area. In response to authenticating the user, the mobile device may transition from displaying the lock screen to displaying the application screen of the note-taking application. The mobile device may continue to capture user inputs, and render the captured user inputs on top of the application screen of the note-taking application (e.g., in the same user input area or location on the electronic display, but on top of a different screen or background, etc.).

In order to conserve battery resources, the mobile device 202 may be configured to enter an inactive interaction state when the mobile device 202 is not being used. While in the inactive interaction state, the mobile device 202 may execute background applications, such as an instant pen application, and limit or restrict users and external applications from reading or writing to the files stored on the mobile device 202. The mobile device 202 may also monitor its sensors (e.g., touchscreen, gyroscope, camera, etc.) to collect sensor data, which may include measurements of movements of the mobile device 202 and/or gestures made by a user of the mobile device 202. The mobile device 202 may determine based on the collected sensor data whether the user has picked up or is otherwise attempting to interact with the mobile device 202.

The mobile device 202 may enter into a write-only interaction state, instant pen mode, a screen-locked state, and/or display a lock screen 204 in response to determining the user has picked up the mobile device 202 or is otherwise attempting to interact with the mobile device 202. The lock screen 204 may regulate immediate access to the mobile device 202 by requiring that the user perform a certain action before accessing certain features of the mobile device 202. For example, the lock screen 204 may require that a user be authenticated for instance by having a user perform a gesture on the device's touchscreen 206, touch a fingerprint reader 208, look into the device's camera 210 (e.g., face unlock, etc.), enter a password or pin, draw a pattern, etc.

While operating in the write-only interaction state in the screen-locked state, the mobile device 202 may provide the user and select device applications limited or partial access to the processing and memory resources of the mobile device 102. For example, while in the write-only interaction state, the mobile device 202 may allow an instant pen application to operate in the background of the mobile device, and provide the user with "write-only" permissions to allow the user to write to the instant pen application. In addition, the mobile device 202 may display user inputs in a user input area 212 on the electronic display of the mobile device 202 for a period of time (e.g., 10 seconds, 30 seconds, 1 minute, etc.).

Upon detecting user inactivity and/or expiration of the time period permitted for the write-only interaction state, the mobile device 202 may cease rendering the user input area 212 on the electronic display (despite the continued rendering of the lock screen 204). The mobile device 20 may store the inputs in a small isolated file in the memory of the mobile device 202. The mobile device 202 may cease rendering the user input area 212 regardless of whether the mobile device 202 remains in the active interaction state, continues to be display the lock screen 204 or reenters the inactive interaction state. The mobile device 202 may also prevent the user from viewing, accessing, deleting, or editing this file until the mobile device 202 authenticates the user and exits the screen-locked state. In some embodiments, the mobile device 202 may be configured to store all the inputs collected over a period of time (e.g., 1 hour, 1 day, etc.) in a single file.

In some embodiments, in response to determining that the user inputs have exceed a threshold (e.g., file size, number of characters, etc.) or in response to determining that a time period has expired, the mobile device 202 may be configured to request that the user preform authentication operations (e.g., enter a password or biometric information, etc.) to exit the lock screen 204.

The mobile device 202 may authenticate the user (e.g., in response to receiving a valid pin, face scan, fingerprint, etc.), cease displaying the lock screen 204, exit the screen-locked state, and commence displaying an unlocked screen 220 that allows the user to access the applications (e.g., notes, weather, settings, app store, etc.) installed on the mobile device 202. The unlocked screen 220 may, include a note-taking application 222, the selection of which by the user may cause the mobile device 202 to display a note file screen 230 that provides the user with access to the notes captured in previous write-only interaction state sessions. The note file screen 230 and/or the instant pen application may provide the user with autonomous organization of the notes/files that are stored locally on the device and/or the note/files that are stored remotely on a network or cloud server.

In some embodiments, the mobile device 202 may be configured to monitor its sensors (e.g., touchscreen, camera, etc.) to detect gestures after the user has been authenticated. The mobile device 202 may determine whether a detected gesture matches a gesture stored in memory, and commence displaying user inputs in a user input area 240 in the unlocked screen 220 in response to determining that a detected gesture matches a gesture stored in memory.

FIGS. 3A, 3B, 4 and 5 illustrate methods 300, 320, 400, 500 for capturing notes by a mobile device. With reference to FIGS. 1-5, the operations of the methods 300, 320, 400, 500 may be performed or implemented in hardware components and/or software components of an mobile device (e.g., mobile device 100, mobile device 202, etc.) the operation of which may be controlled by one or more processors (e.g., the processors 106, 116, etc.).

Figure 3A:
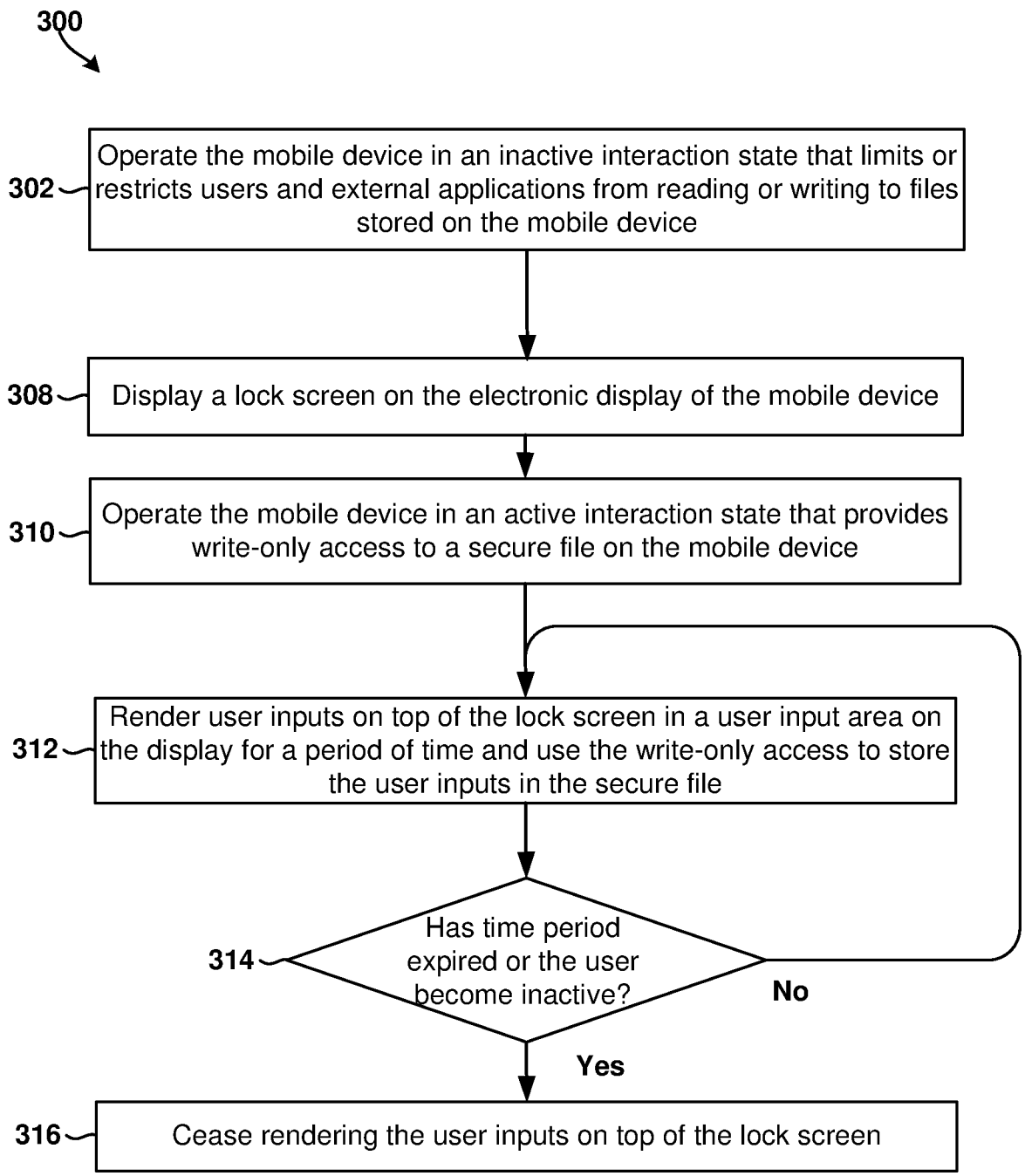
FIGS. 3A through 7D are process flow diagrams illustrating methods of capturing notes in accordance with the various embodiments.

Referring to FIG. 3A, in block 302 the mobile device may enter and operate in an inactive interaction state that limits or restricts users and external applications from reading or writing to files stored on the mobile device.

In block 310, the processor may cause the mobile device to operate in an active interaction state that provides write-only access to a small secure file on the mobile device. In some embodiments the write-only access secure file may be isolated from the other software applications operating on the mobile device. In some embodiments, the mobile device may be configured to render the note-saving input box on the lock screen after detecting user activity. In some embodiments, the mobile device may be configured to always render the note-saving input box on the lock screen. In some embodiments, the mobile device may be configured to render the note-saving input box on the locked-screen or on any other screen (e.g., when the device is unlocked and the user is using other applications on the device, etc.) in response to detecting a special finger gesture.

In various embodiments, in write-only mode initiated in block 310, the user may be permitted to enter a limited amount of text or numbers and for a limited time (e.g., 10 seconds, 30 seconds, 1 minute, etc.).

In some embodiments, the mobile device may be configured to Operate in a "whiteboard" mode in block 310. The mobile device may determine whether inputs received in a note-saving input box (e.g., on the lock screen, in an "insta-pen" mode, etc.) were inputted using a stylus/finger. The mobile device may store non-text inputs from the stylus/finger as writing or converted to text. For example, the mobile device may convert shapes drawn on the lock screen to letters. The mobile device may perform the conversion in the screen-locked state, or after the device is unlocked (e.g., the inputs may be saved in screen-locked state and converted later).

In some embodiments, the mobile device may be configured to support multiple users in block 310 by distinguishing between notes/inputs from different users and switching user profiles. For example, the mobile device may be associate inputs received from a first stylus with one user, and the inputs received form a second stylus switch another user. The mobile device may switch user profiles based on the stylus used. In some embodiments, the mobile device may be configured to switch user profiles based on the actuation of a selection button included on stylus, mobile device, or on another device communicatively coupled to the mobile device. In some embodiments, the mobile device may be configured to differentiate between users based on biometrics (e.g., facial recognition, fingerprint, etc.), via the stylus, via smart watch/ring, or other methods conventionally used to authenticate a user. In some embodiments, the mobile device may be configured to classify a user as an unknown user, create a profile for the unknown user, and/or switch to an unknown user profile (e.g., when user authentication fails, etc.). In some embodiments, the mobile device may be configured to differentiate between users based on writing style (e.g., hand-writing or character recognition) or any other way to known in the art for determining between first user profile and a second user profile (or an unknown user profile).

In block 312, the mobile device may render user inputs on top of the lock screen in a user input area (e.g., area 240 on the display 212 illustrated in FIG. 2, etc.) for the limited period of time (e.g., 10 seconds, 30 seconds, 1 minute, etc.) and use the write-only access permissions provided by the active interaction state in block 310 to store the user inputs in the secure file. The size and security of the file may allow the user to input a limited amount of information while the device is locked. Limiting the amount of information that may be entered in this mode may prevent hackers or other nefarious actors from inputting a large amount of information that consumes a significant amount of the device's memory resources and/or which could have a negative impact on other background applications operating on the mobile device. Further, by storing the information in an isolated and secure file, various embodiments prevent hackers or other nefarious actors from injecting malware or inputting information (e.g. URL to a website with a virus, etc.) that could harm the mobile device.

In some embodiments, the mobile device may be configured to populate and store the note-saving file in a memory of the mobile device without authenticating the user to the mobile device. In some embodiments, the mobile device may be configured to not render or display the contents of the note-saving file after it is stored in memory in some embodiments, the mobile device may be configured to store all the notes/inputs received within a predefined duration (e.g., 20 seconds, etc.) in the same note-saving file. In some embodiments, the mobile device may be configured to automatically name the note-saving file, for instance, as it is saved or any other suitable moment. In some embodiments, the note-saving file may be a database file and/or the mobile device may be configured to used database technologies or techniques to create or store the note-saving file. In some embodiments, the mobile device may be configured to store all the notes or received inputs in a single note-saving file. In some embodiments, the mobile device may be configured to store each note in conjunction with a time stamp and/or location information.

In determination block 314, the mobile device may determine whether the time period for receiving and rendering user inputs has expired and/or whether the user has become inactive (e.g., has stopped typing, speaking, or otherwise inputting information) for a period of time (e.g., 5 seconds, 10 seconds, etc.). In some embodiments, the mobile device may cease rendering the note-saving input box after detecting inactivity or expiration of the time period. In response to determining that the time period has not expired and the user has not become inactive (i.e., determination block 314="No"), the mobile device may continue to render the user inputs on top of the lock screen in the user input area on the mobile device display in block 312.

In response to determining that the time period for receiving and rendering user inputs has expired or that the user has become inactive (i.e., determination block 314="Yes"), the mobile device may cease rendering the user inputs on top of the lock screen in the user input area (e.g., the use input area 240 on the display 212 illustrated in FIG. 2, etc.) in block 316. By suspending the write-only interaction state (i.e. ceasing the receiving and rendering of the user inputs on top of the lock screen), various embodiments may prevent a user that is entering a quick note while the device is in the screen-locked state from accessing previously recorded notes or data from other applications. This may improve the privacy and functionality of the mobile device.

Figure 3B:
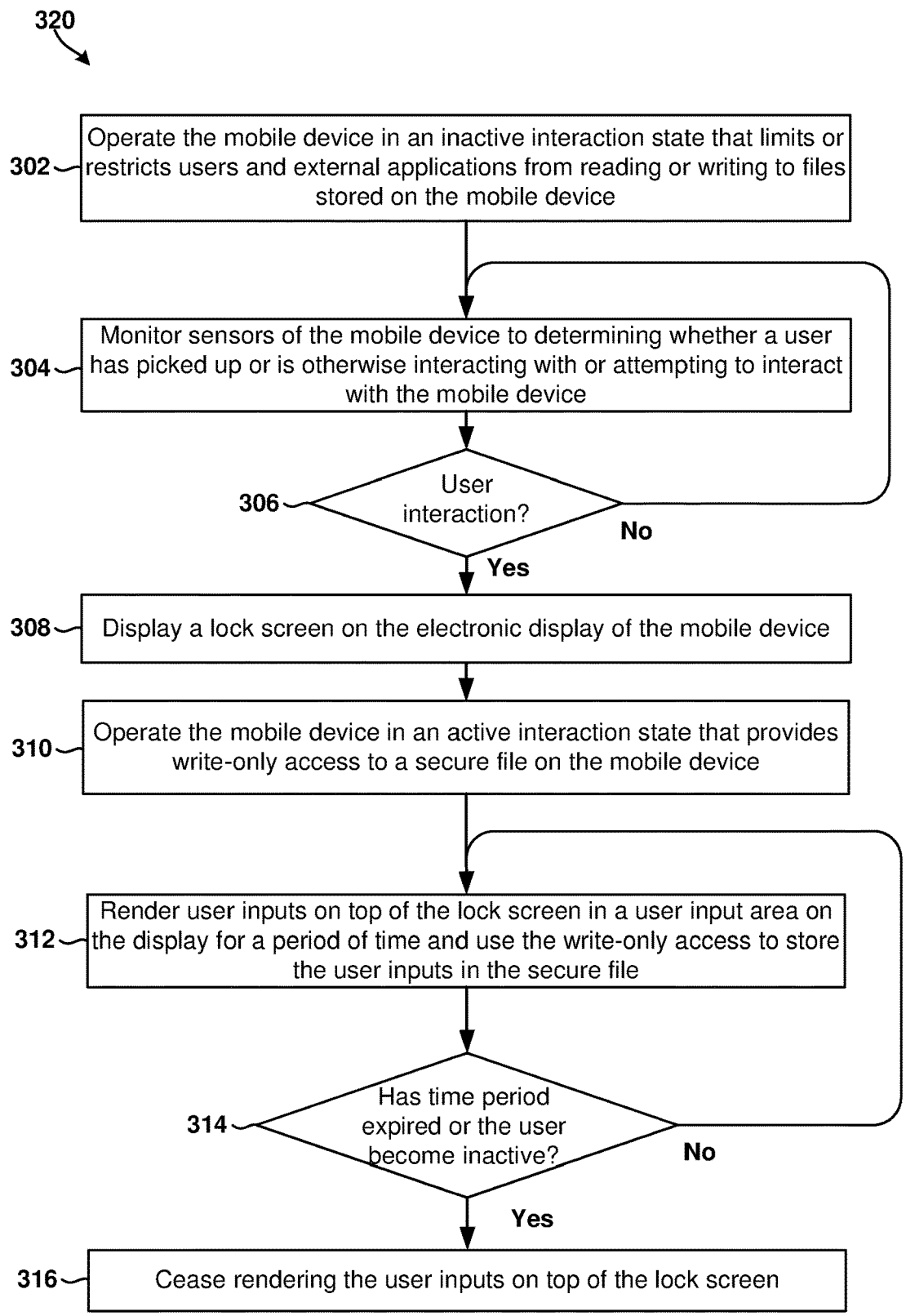

Referring to FIG. 3B, in block 302 and 308-316, the mobile device may perform the operations of the like numbered blocks of the method 300 as described. In block 304, the mobile device may monitor sensors of the mobile device that provide information useful for determining whether a user has picked up or is otherwise interacting with or attempting to interact with the mobile device. For example, the processor may monitor electronic gyroscopes and/or accelerometers to detect motions consistent with the user picking up the mobile device. As another example, the processor may monitor a front-facing camera to determine whether the user is looking at the mobile device. As a further example, the processor may interpret touches on the touch sensitive display as user attempts to interact with the mobile device.

In determination block 306, the mobile device may determine whether the user has picked up or is otherwise interacting with or attempting to interact with the mobile device based on sensor inputs and analysis in block 304. In response to determining that the user has not picked up the mobile device or is not otherwise interacting with or attempting to interact with the mobile device (i.e., determination block 306="No"), the mobile device may continue to monitor sensors of the mobile device in block 304.

In response to determining that the user has picked up the mobile device or is otherwise interacting with or attempting to interact with the mobile device (i.e., determination block 306="Yes"), the mobile device may perform the operations of blocks 308-316 of the method 300 as described.

Figure 4:
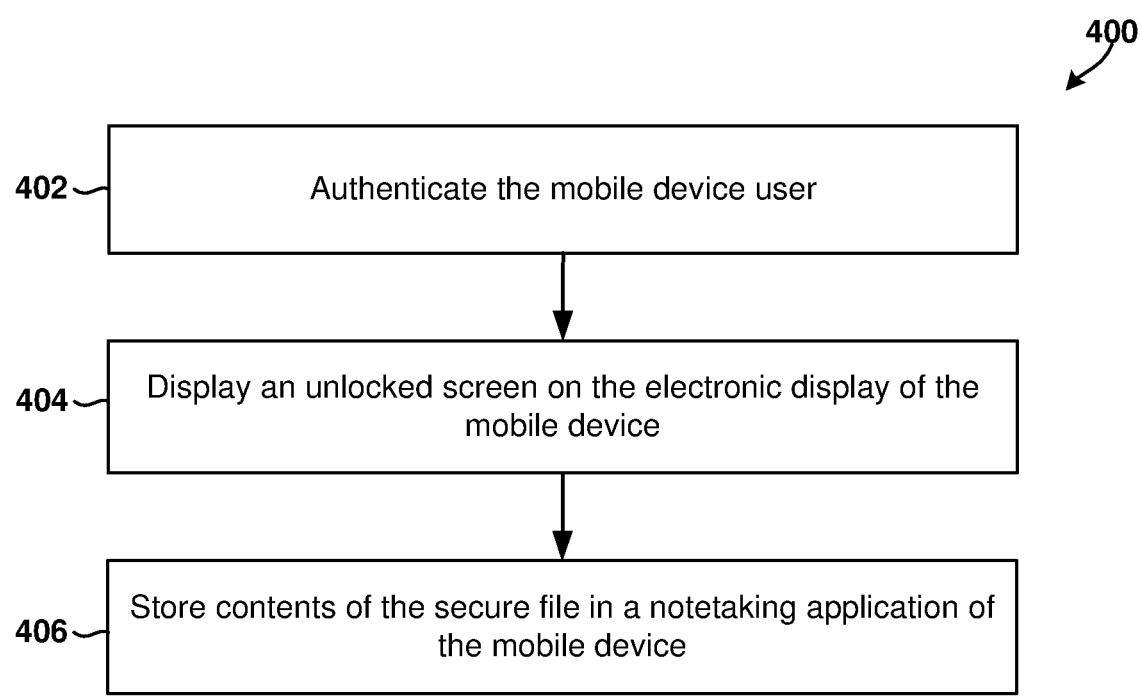

Referring to FIG. 4 (which may be implemented with the embodiments of FIGS. 1-3 or any other embodiments disclosed herein), in block 402 of the method 400, the mobile device may authenticate the mobile device user using a variety of conventional authentication mechanisms. For example, the mobile device may request that the user perform a gesture on device's touchscreen, enter a password or pin, draw a pattern, touch a fingerprint reader, or look into the device's camera (e.g., face unlock, etc.), and authenticate the mobile device user if the user's inputs or biometric information matches information stored in memory. In some embodiments, the mobile device may be configured to determine and compare the number of input characters received for a note or within a predefined duration (e.g., 20 seconds, etc.) to an input threshold value, and trigger an authentication procedure (e.g., request that the user input a password or biometric information on the lock screen to unlock the mobile device) in response to determining that the number of input characters satisfies (e.g., meets or exceeds) the input threshold value.

In response to authenticating the user in block 402, the mobile device may display an unlocked screen that provides the user with full access to the mobile device in block 404, including access to data stored on the device and use of software applications.

In block 406, the mobile device may store contents of a secure file (e.g., the user inputs receive as part of the operations in block 312, etc.) in a note-taking application of the mobile device. Thus, a note that was entered by the user on the lock screen during the text only mode may be stored in memory within a note application as well as accessed (e.g., red, edited or deleted) by the user via the note-taking application once the user has been authenticated by the mobile device.

Figure 5:
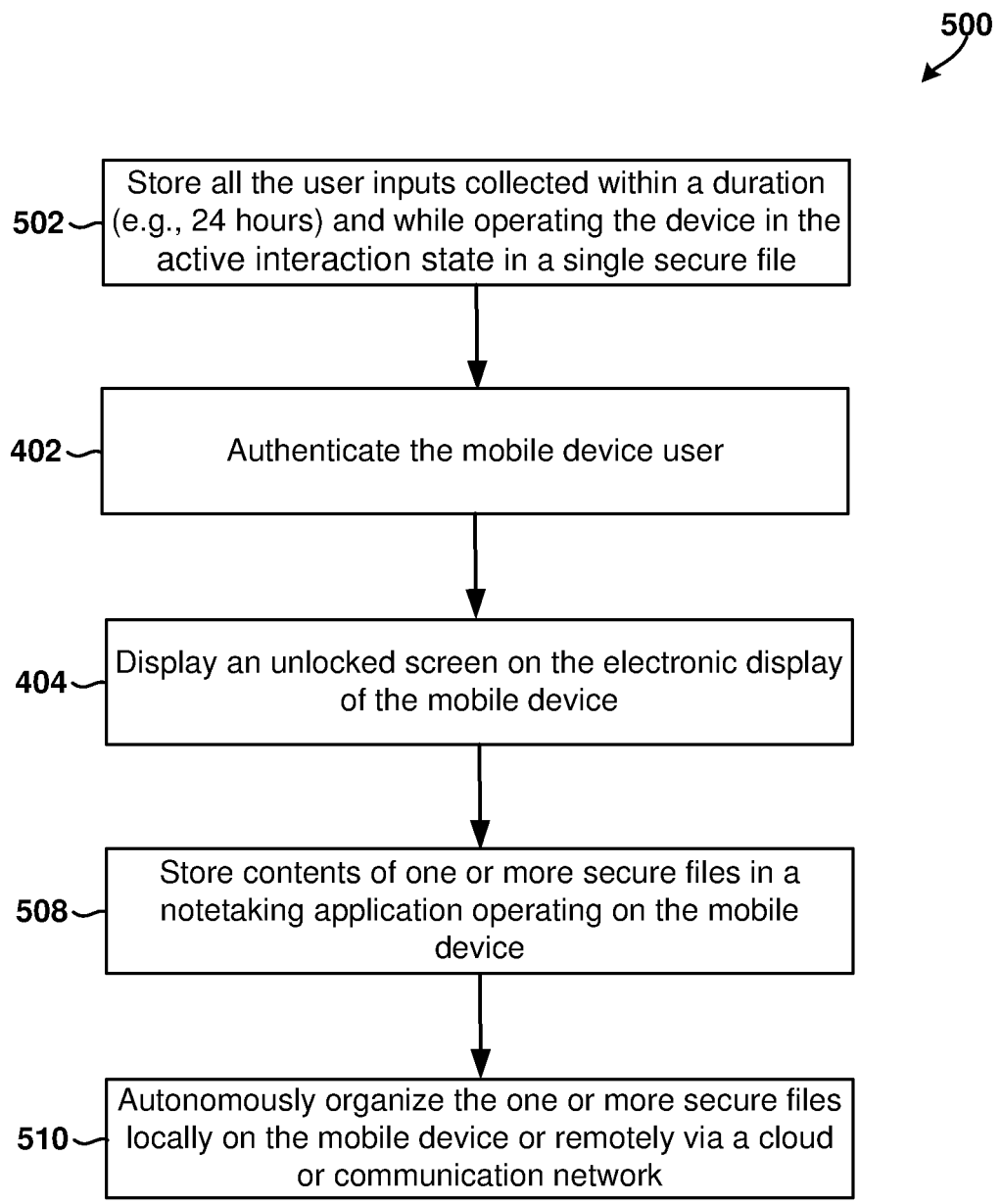

Referring to FIG. 5 (which may be implemented with the embodiments of FIGS. 1-4 or any other embodiments disclosed herein), in block 502 of the method 500, the mobile device may store (e.g., in a single file, in multiple files, in a local memory of the mobile device, in a cloud server, etc.) user inputs received while the device operated in the locked and active interaction states (e.g., in blocks 308-312, etc.) within a previous duration (e.g., the preceding 24 hours, etc.). Thus, as the user enters notes and text in the text only lock screen mode, the inputs may be temporarily stored in memory and then consolidated into a single file spanning a predetermined amount of time. For example, the user may configure the text only lock screen application to consolidate all notes into a single file that were entered over the span of an hour, a workday, 24 hours, a week, etc.

In blocks 402 and 404, the mobile device may authenticate the user and display an unlocked screen that provides the user with more robust access to the device or its software applications as described for the like numbered blocks of the method 400. In some embodiments, the mobile device may be configured to render a view of the note-saving files when the user launches the note-taking application and/or when the device is operating in a normal, full, or unlocked operating mode in which the lock screen is no longer displayed. The view of the note-saving files may include a listing or the note-saving flies, the contents of a note-saving file, etc. The view may group the note-saving files by date, time, location, length, relevance, etc. In some embodiments, the view may be configured by the user and/or based on user preferences. In some embodiments, the mobile device may generate or render the view of the note-saving files remotely or locally on the device. The view may be generated locally by default, and the user may have the option to generate the view remotely.

In block 508, the mobile device may store in a note-raking application the contents of one or more secure files that each store the user inputs collected within a duration (e.g., 24 hours, etc.) while the device operated in the locked and active interaction states in some embodiments, the mobile device may be configured to store each note or each group of received inputs (e.g., inputs received within the predefined duration) in a separate note-saving file. In such embodiments, each note or note-saving file may be provided with a time and/or date description in the filename and/or title of note-saving file. For example, the mobile device may generate the filename "1212201301.txt" for a note created Dec. 12, 2020 at 1:01 PM. Alternatively or additionally, the mobile device may generate the note-saving files to include metadata or a title that includes a time and/or date description (e.g., "Note from 12/12/20 1:01 pm"). In some embodiments, the mobile device may be configured so that the notes that are written on device are saved by pressing a save button (e.g., soft button on screen, a physical button on device, physical/'soft button on a related device (e.g., paired stylus, smart watch, etc.), etc.). In some embodiments, the mobile device may be configured so the notes that are being written on device are saved by locking the device (e.g., pressing button that would lock the device even if the device is already locked), based on an inactivity timer since the note was last written, periodically (auto save feature), etc.

In block 510 the mobile device may autonomously organize the one or more secure files locally on the mobile device or remotely via a cloud or communication network. For example, the user may define through user settings categories, selection criteria, storage locations, routing information and other user-specified ways that the processor should organize the notes and information that were entered by the user via the text only lock screen application.

In some embodiments, in block 510 the mobile device may be configured to convert the contents of an audio-based note-saving file to a text file, and vice versa. In some embodiments, in block 510 the mobile device may be configured to automatically organize the note-saving files (e.g., by date, time, location, filename, length, relevance, priority, etc.). In some embodiments, in block 510 the mobile device may be configured to generate and/or organize the note-saving files so that each note-saving file is an action item (e.g., all book names, etc.). In some embodiments, in block 510 the mobile device may be configured to associate or apply different categories or principles to each note-saving file. In some embodiments, in block 510 the mobile device may be configured to send the note-saving files to a cloud server for further processing and/or organization.

In some embodiments, in block 510 the mobile device may be configured to sort the note-saving files as recorders in a chronological order in a database file. In some embodiments, in block 510 the mobile device may be configured to determine and add time and location for each note-saving file to facilitate automatic further processing of the notes. In some embodiments, in block 510 the mobile device may be configured to grouped the note-saving files according to time (e.g., date, time, etc.) and present the user the view of a file list with each file numbered with date. In some embodiments, in block 510 the mobile device may be configured to group the note-saving files together. The mobile device may further expand grouped notes so that the note record may be presented to the user for reading and for further processing.

In some embodiments, in block 510 the mobile device may be configured to complement the note-saving files, either locally or remotely. For example, when operating in the function mode of various embodiments, the mobile device may identify note records that include only a few words and/or that do not describe a complete meaning, and provide the user with options for automatically complementing those notes, such as by adding words, punctuation, etc.

In some embodiments, the mobile device may be configured to provide the user with periodic reminders to save or otherwise act on notes (e.g., save, edit, categorize, ignore, etc.). The mobile may render the reminders on the locked-screen or on any other screen (e.g., when the device is unlocked, the user is using other applications, etc.).

Figure 6:
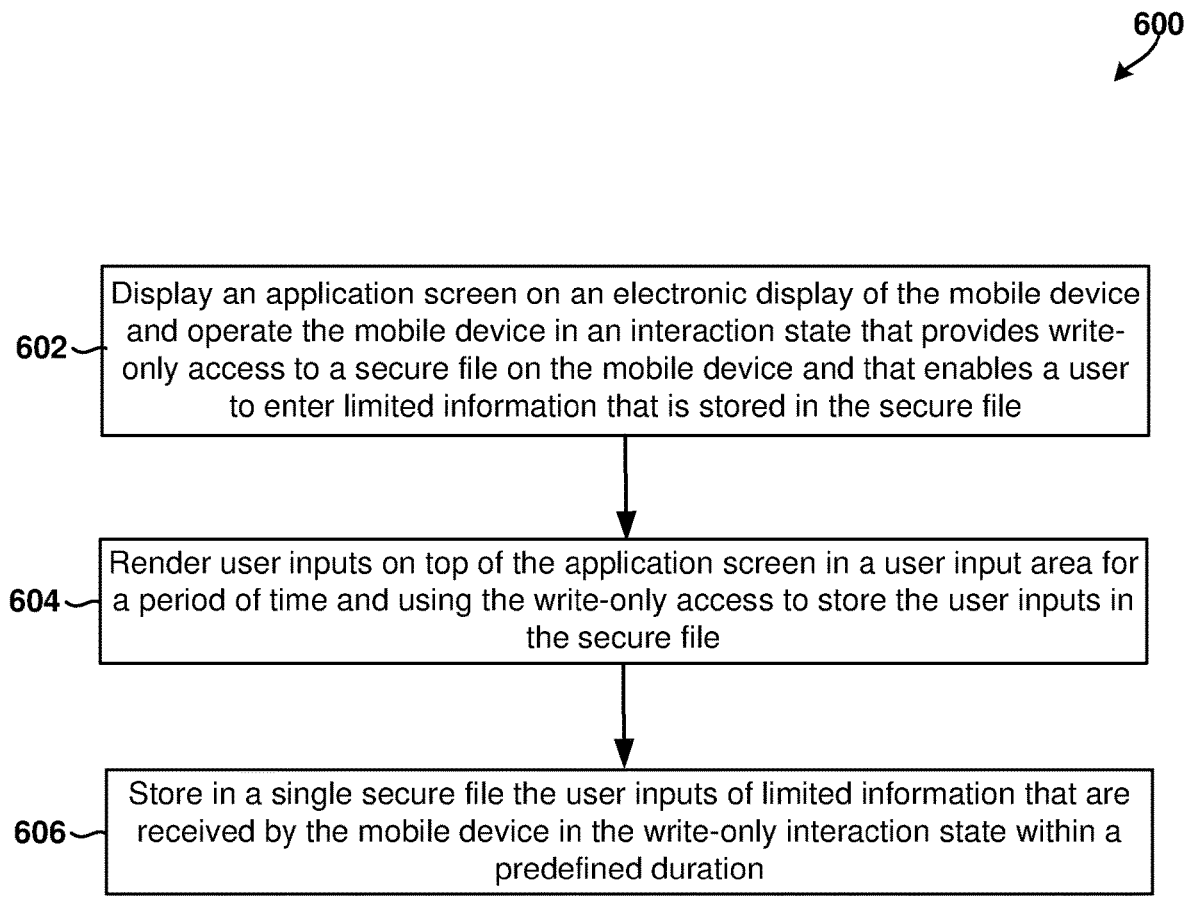

FIG. 6 illustrates a method 600 of capturing notes on a mobile device in accordance with some embodiments. With reference to FIGS. 1-6, the operations of the method 600 may be performed or implemented in hardware components and/or software components of an mobile device (e.g., mobile device 100, mobile device 202, etc.) the operation of which may be controlled by one or more processors (e.g., the processors 106, 116, etc.).

In block 602, the mobile device may display a lock screen on an electronic display of the mobile device and operate in a write-only interaction state that provides write-only access to a secure file on the mobile device and that enables a user to enter limited information that is stored in the secure file.

In block 604, the mobile device may render user inputs on top of the lock screen in a user input area for a period of time and use the write-only access to store the user inputs in the secure file. The mobile device may cease receiving and rendering the user inputs in response to expiration of the period of time or in response to detecting user inactivity.

In block 606, the mobile device may store in a single secure file the user inputs of limited information that are received by the mobile device in the write-only interaction state within a predefined duration.

FIGS. 7A-7D illustrate methods 700, 720,740, 760 of capturing notes on a mobile device in accordance with some embodiments. With reference to FIGS. 1-7D, the operations of the methods 700, 720, 740, 760 may be performed or implemented in hardware components and/or software components of an mobile device (e.g., mobile device 100, mobile device 202, etc.) the operation of which may be controlled by one or more processors (e.g., the processors 106, 116, etc.).

Figure 7A:
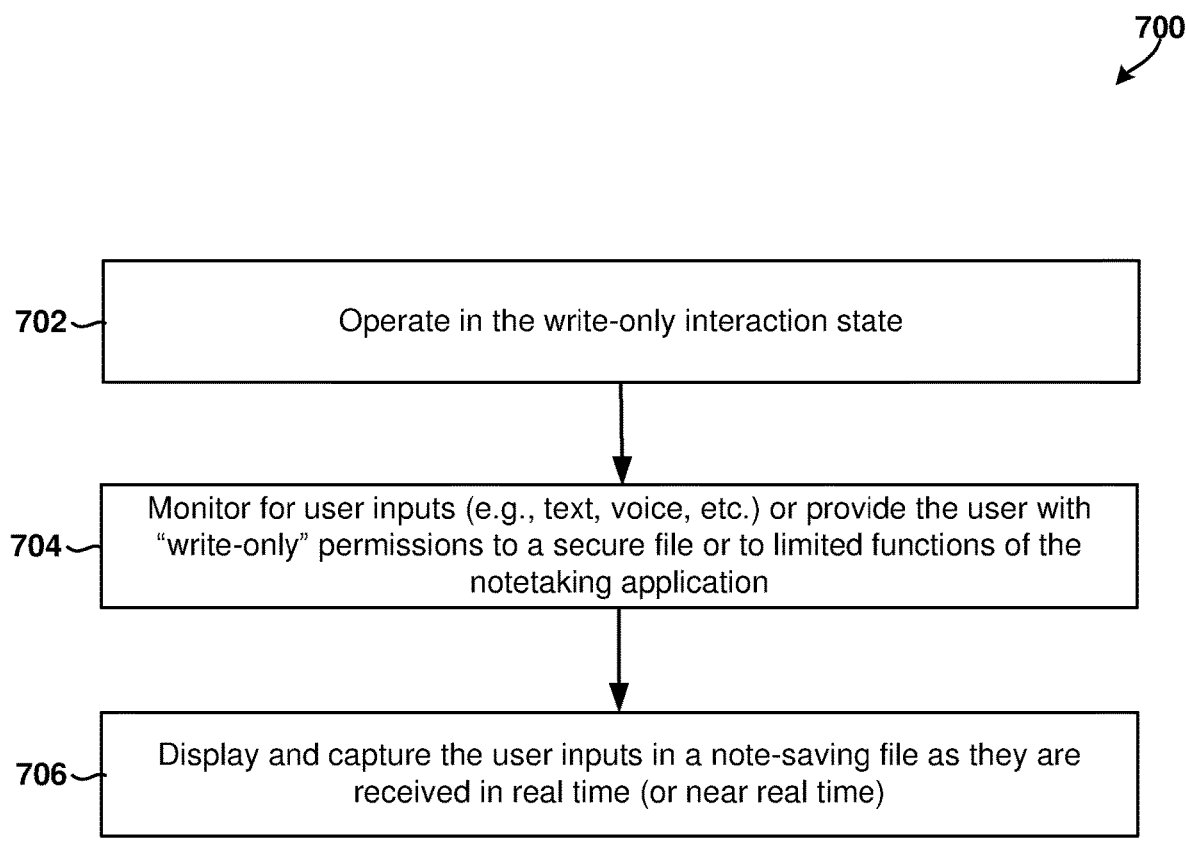

Referring to FIG. 7A, in block 702 of the method 700, the mobile device may operate in the write-only interaction state or instant pen mode. In block 704, the mobile device may monitor for user inputs (e.g., text, voice, etc.) or provide the user with "write-only" permissions to a secure file or to limited functions of the notetaking application. In block 706, the mobile device may display and capture the user inputs in a note-saving file as they are received in real time (or near real time).

Figure 7B:
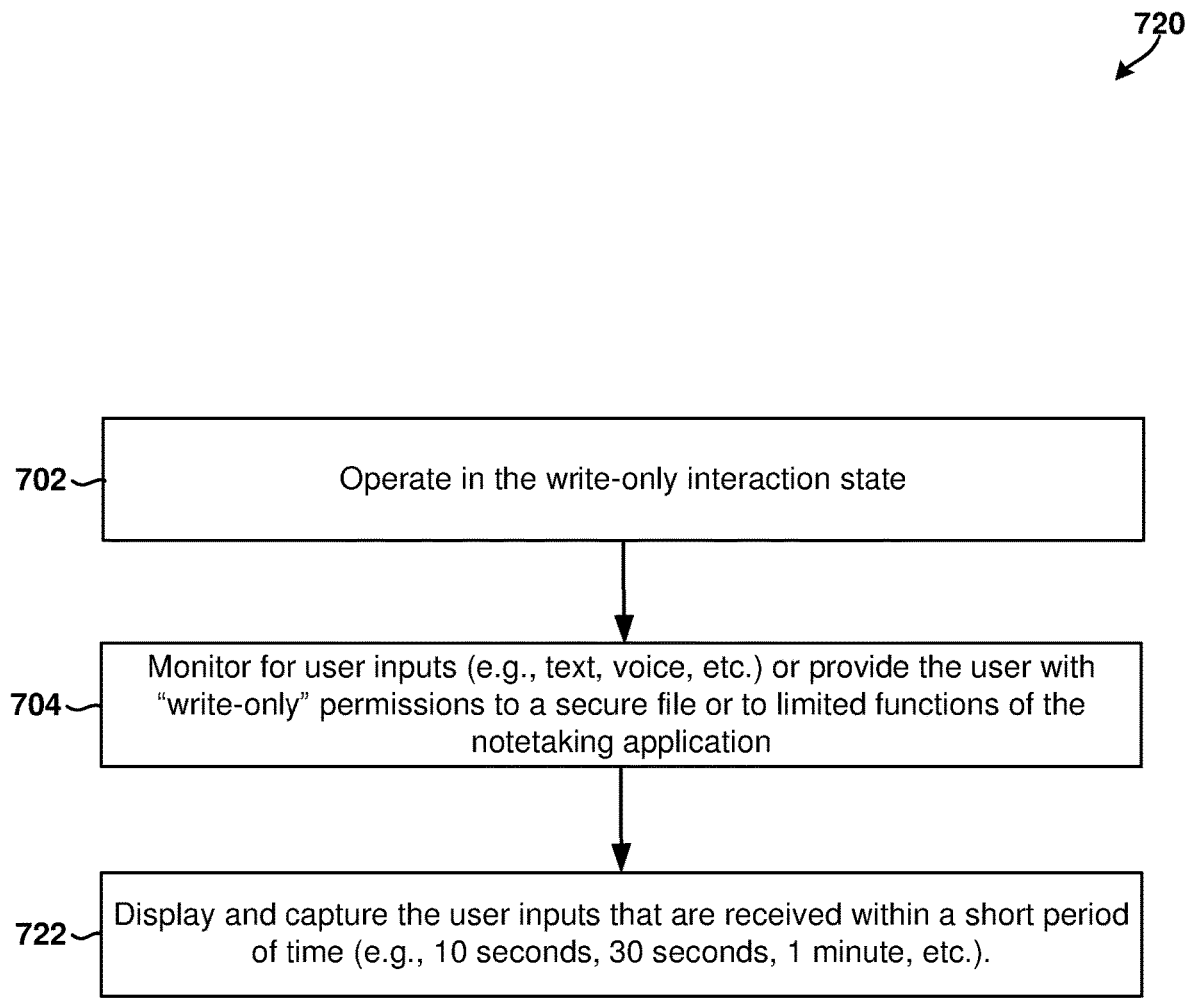

Referring to FIG. 7B, in blocks 702 and 704 of the method 720, the mobile device may perform the operations of the like number blocks of the method 700 as described. In block 7B, the mobile device may display and capture the user inputs that are received within a short period of time (e.g., 10 seconds, 30 seconds, 1 minute, etc.).

Figure 7C:
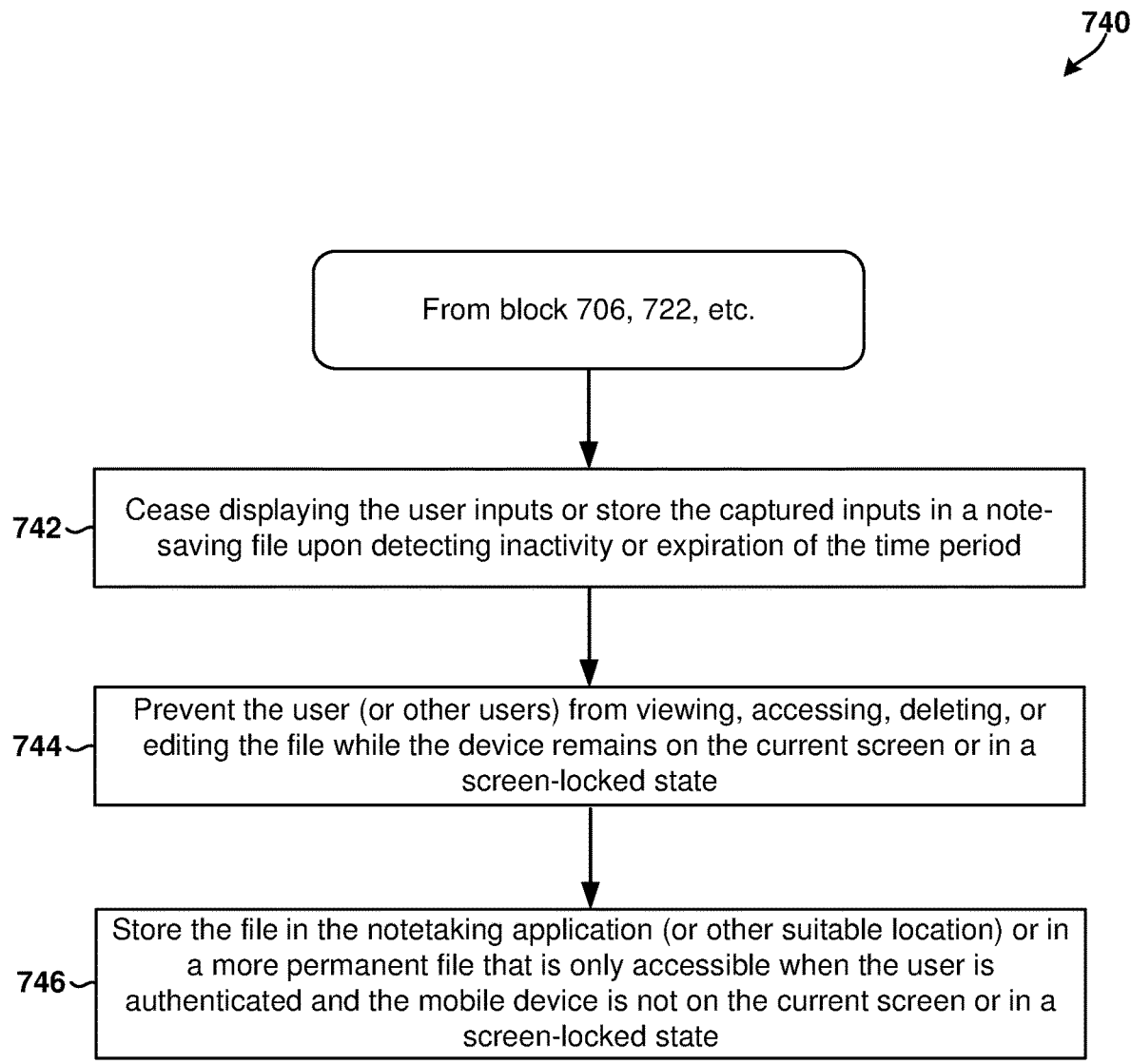

Referring to FIG. 7C, after the operations in block 706 of the method 700 or block 722 of the method 720, the mobile device may cease displaying the user inputs and/or store the captured inputs in a note-saving file upon detecting inactivity or expiration of the time period in block 742 of the method 740. Such a note-saving file may be a single, small, isolated, and/or secured file that is relatively limited in size. In block 744, the mobile device may prevent the user (or other users) from viewing, accessing, deleting, or editing the file while the device remains on the current screen or in a screen-locked state. In block 746, the mobile device may store the file in the notetaking application (or other suitable location) or in a more permanent file that is only accessible when the user is authenticated and the mobile device is not on the current screen or in a screen-locked state.

Figure 7D:
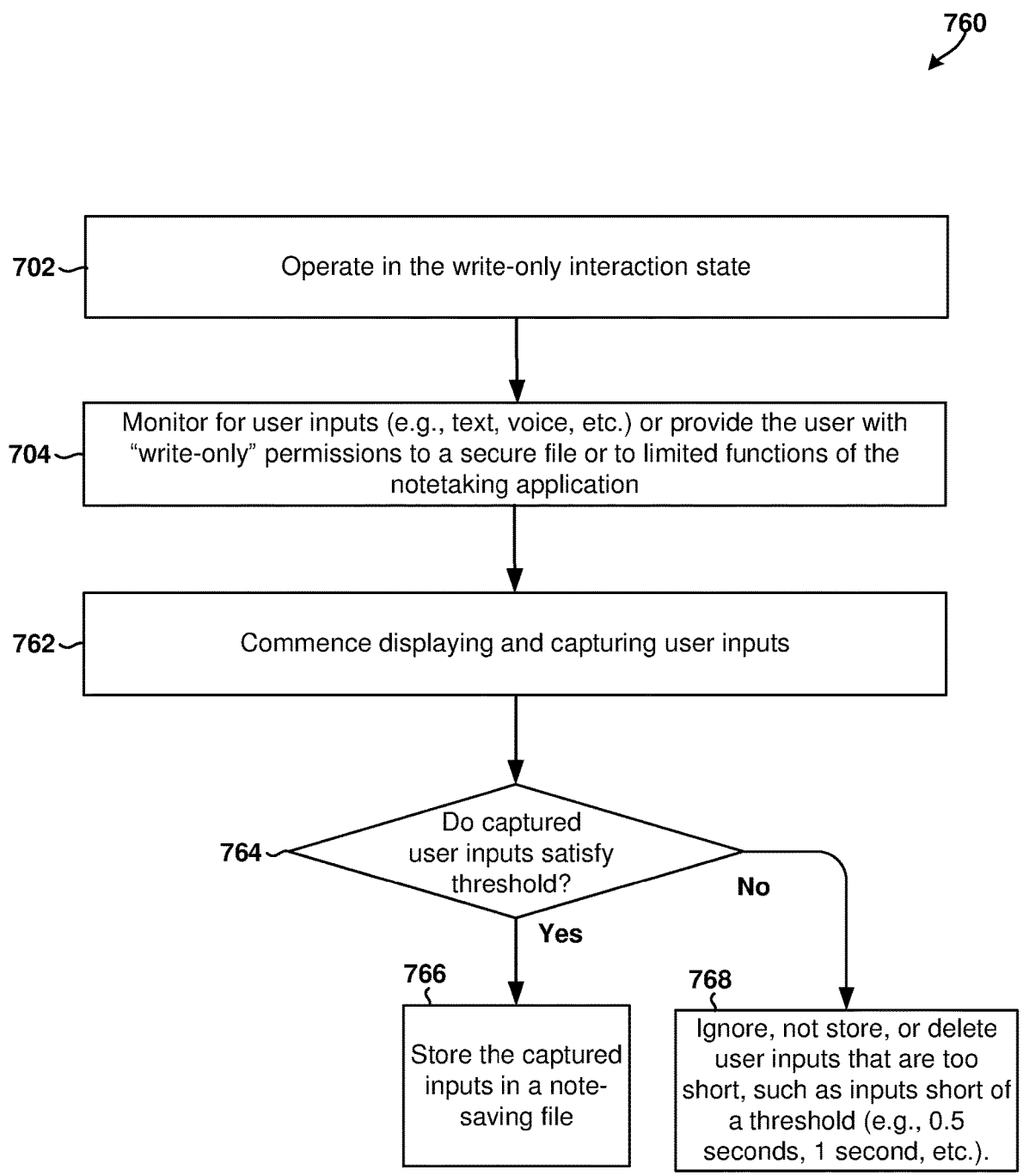

Referring to FIG. 7D, in blocks 702 and 704 of the method 760, the mobile device may perform the operations of the like number blocks of the method 700 and 720 as described. In block 762, the mobile device may commence displaying and capturing user inputs.

In determination block 764, the mobile device may determine whether the captured user inputs satisfy threshold. For example, the mobile device may determine and compare the number of input characters received for a note or within a predefined duration (e.g., 20 seconds, etc.) to an input threshold value in block 762. As a further example, the mobile device may determine whether that the mobile device has not been unlocked for a threshold amount of time or test any other similar condition in block 762.

In response to determining that the captured user inputs satisfy threshold (i.e., determination block 764="Yes"), the mobile device may store the captured inputs in a note-saving file in block 766.

In response to determining that the captured user inputs do not satisfy threshold (i.e., determination block 764="No"), the mobile device may ignore, not store, or delete the user inputs in block 768. For example, in block 768, the mobile device may delete inputs that are too short, such as inputs short of the threshold (e.g., 0.5 seconds, 1 second, etc.).

FIG. 88E illustrate methods 800, 820, 840, 860, 880 of activating or exiting the write-only interaction state to capture notes on a mobile device in accordance with some embodiments. With reference to FIGS. 1-8E, the operations of the methods 800, 820, 840, 860, 880 may be performed or implemented in hardware components and/or software components of an mobile device (e.g., mobile device 100, mobile device 202, etc.) the operation of which may be controlled by one or more processors (e.g., the processors 106, 116, etc.).

Figure 8A:
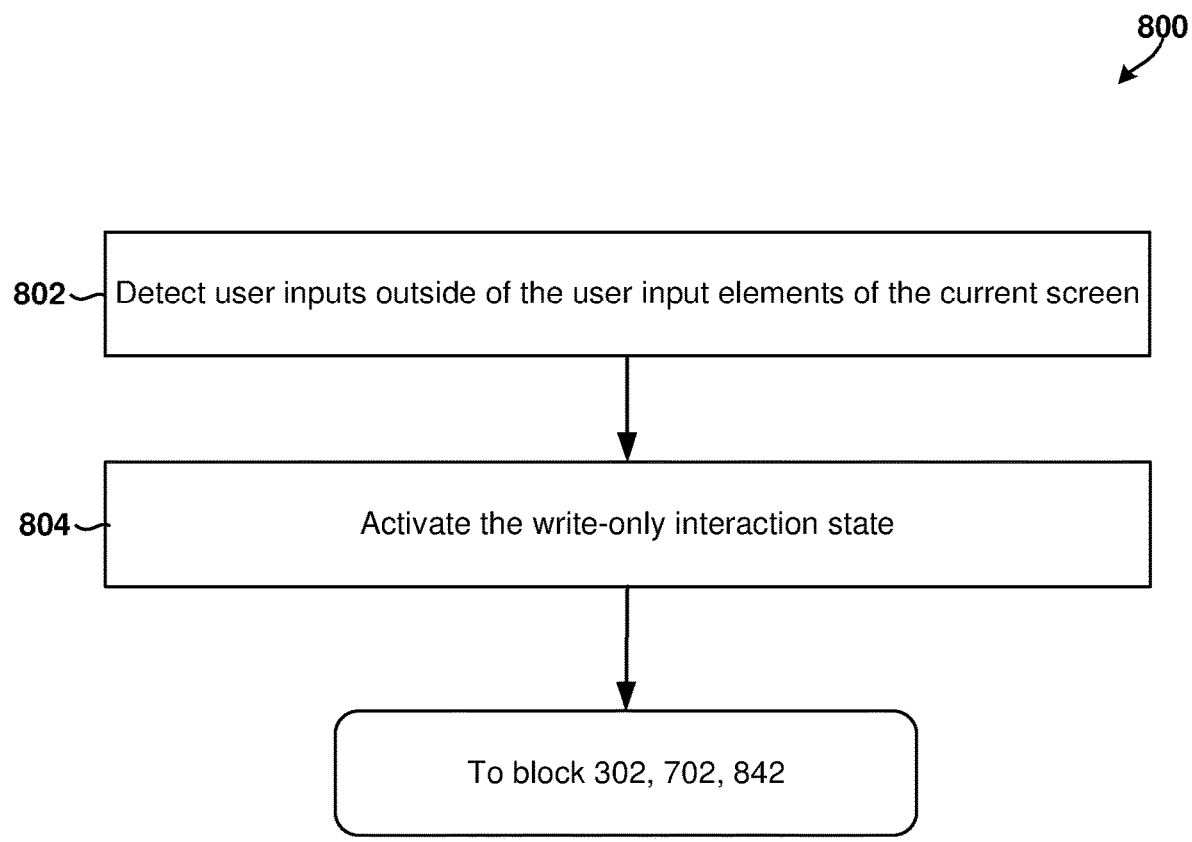
FIGS. 8A-E are process flow diagrams illustrating methods of activating or exiting the write-only interaction state to capture notes on a mobile device in accordance with some embodiments.

Referring to FIG. 8A, in block 802 of the method 800, the mobile device may detect user inputs outside of the user input elements of the current screen. In some embodiments, the current screen may be a lock screen. In block 804, the mobile device may activate the write-only interaction state. That is, in the example illustrated in FIG. 8A, the mobile device activates the write-only interaction state in response to the mobile device detecting user inputs outside of the user input elements of the current screen (lock screen). While operating in the write-only interaction state, the mobile device may monitor the screen for user inputs (e.g., text, voice, etc.) and/or provide the user with "write-only" permissions to a secure file and/or to limited functions of the note-taking application. The mobile device may then perform the operations in one of blocks 302 of the method 300, block 702 of the method 700, or block 842 of the method 840 (FIG. 8C) as described.

Figure 8B:
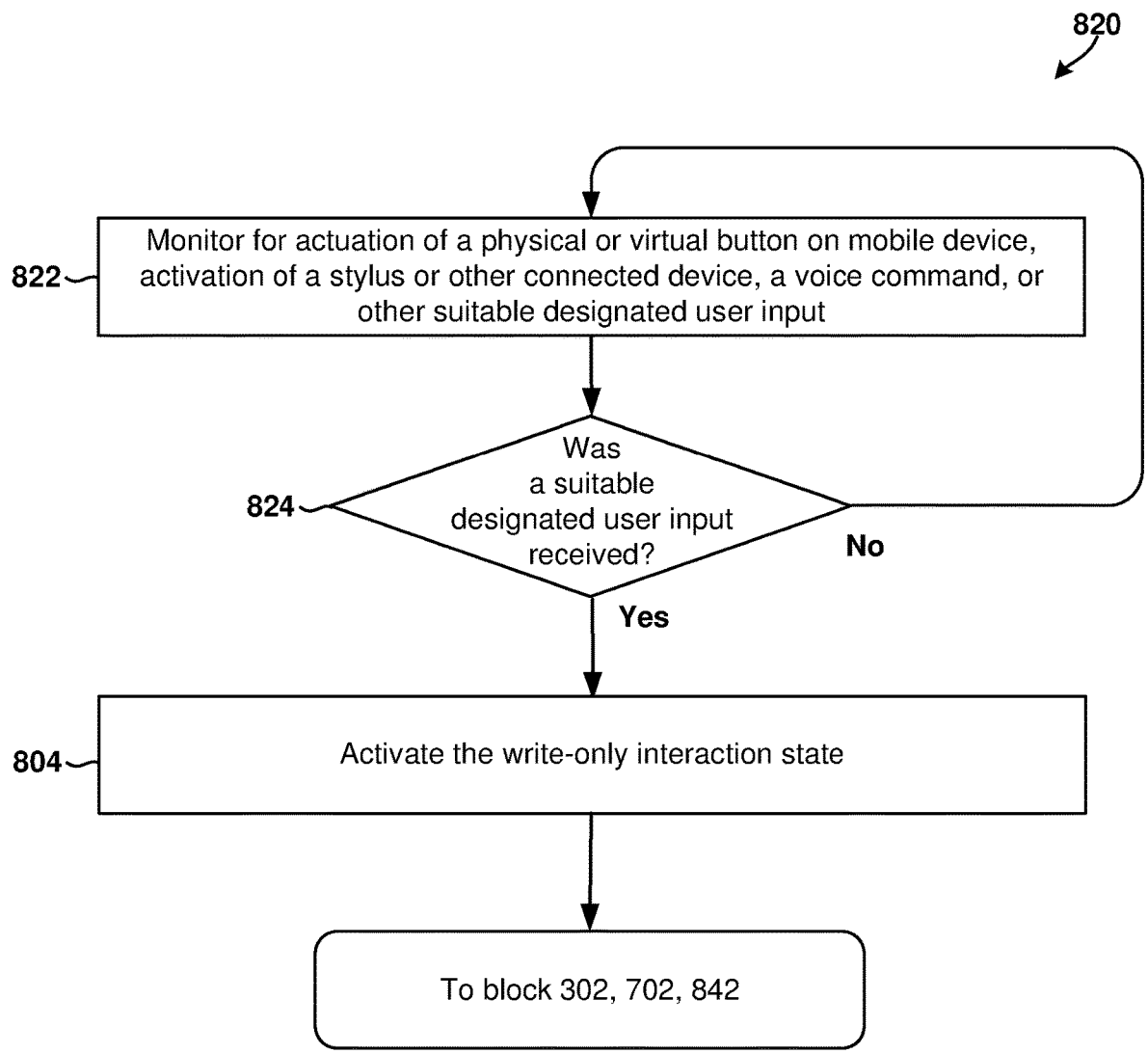

Referring to FIG. 8B, in block 822 of the method 820, the mobile device may monitor the mobile device systems for actuation of a physical or virtual button on mobile device, activation of a stylus or other connected device, a voice command, or other suitable designated user input that indicates that the mobile device should operate in the write-only interaction state and/or that user intends to take notes on the mobile device. In determination block 824, the mobile device may determine whether a suitable designated user input has been received on the mobile device. For example, the mobile device may determine whether a designated physical or virtual button was actuated, a stylus or connected device was activated, a suitable voice command was received, etc.

In response to determining that a suitable designated user input has not been received (i.e., determination block 824="No"), the mobile device may continue to monitor for actuation of a physical or virtual button, etc. in block 822.

In response to determining that a suitable designated user input has been received (i.e., determination block 824="Yes"), the mobile device may activate the write-only interaction state in block 804. The mobile device may then perform the operations in one of blocks 302 of the method 300, block 702 of the method 700, or block 842 of the method 840 (FIG. 8C) as described.

Figure 8C:
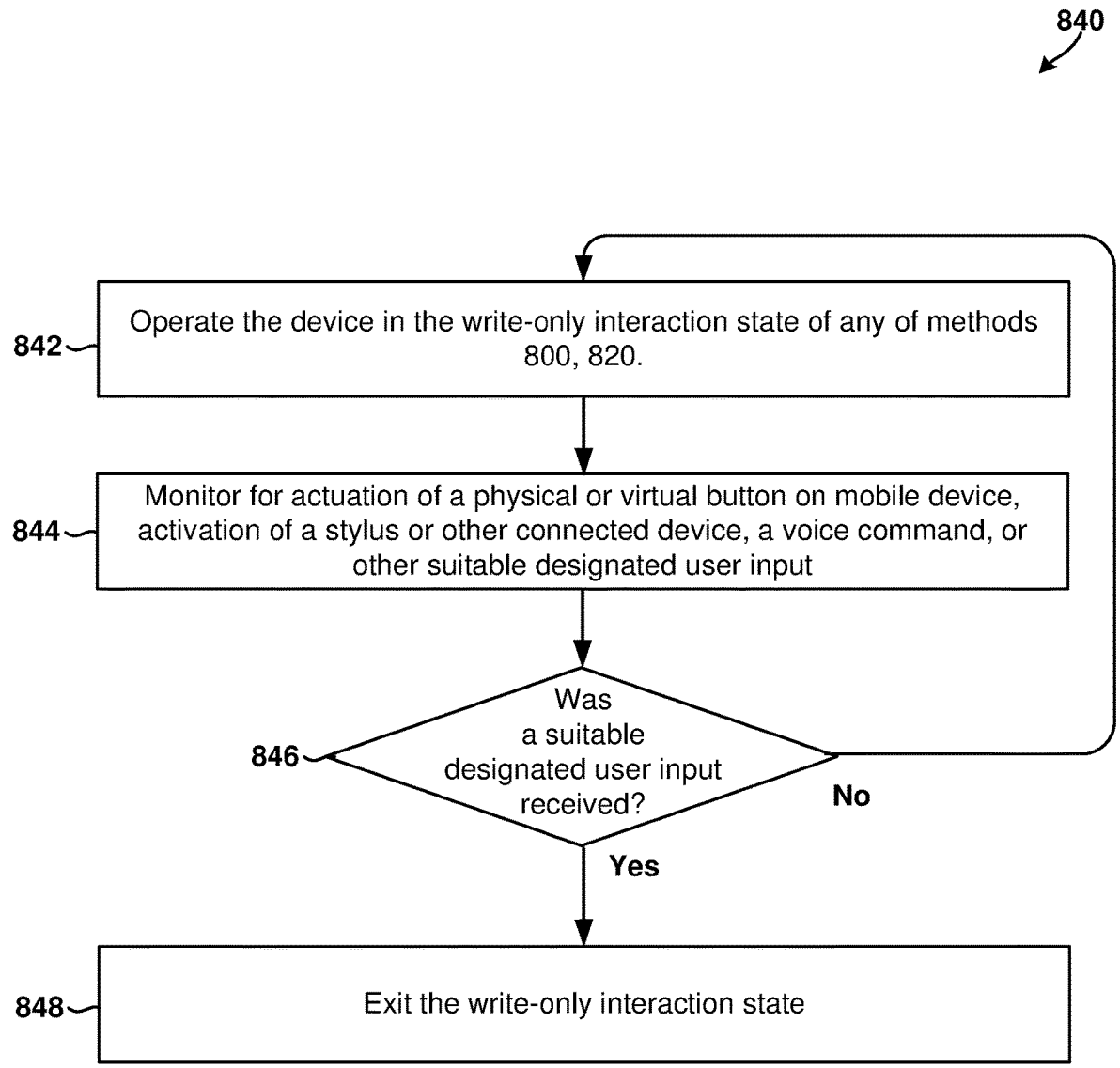
Figure 8D:
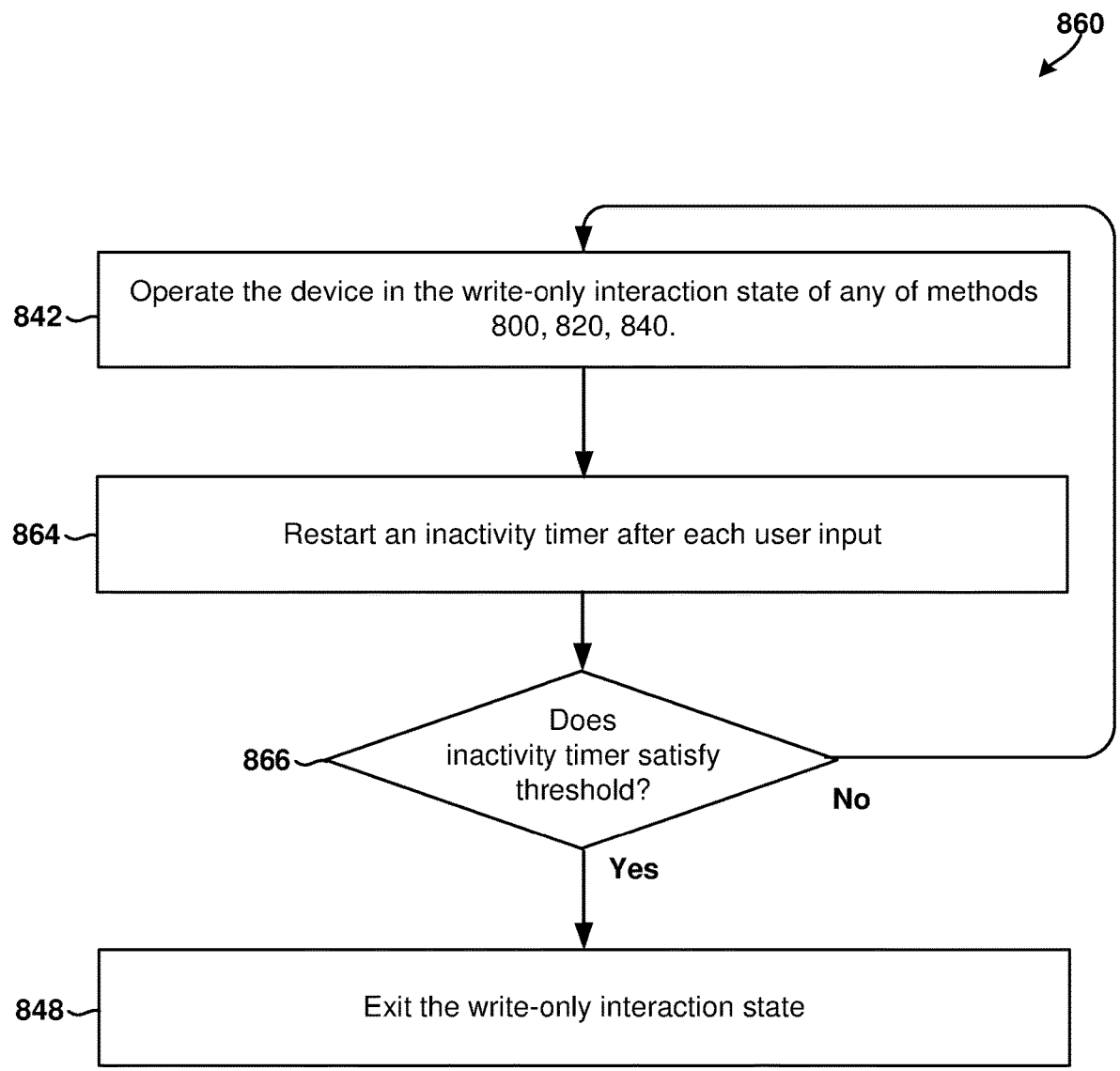

Referring to FIG. 8C, in block 842 of the method 840, the mobile device may operate in the write-only interaction state in accordance with any of the methods discussed above (e.g., method 800, 820, etc.). In block 844, after entering the write-only interaction state, the mobile device may monitor the mobile device systems for actuation of a physical or virtual button on mobile device, activation of a stylus or other connected device, a voice command, or other suitable designated user input that indicates that the mobile device should cease operating in the write-only interaction state, the user has finished entering a note on the mobile device, or that the note should otherwise be saved or deleted.

In determination block 846, while operating in the write-only interaction state, the mobile device may determine whether a suitable designated user input has been received on the mobile device. In response to determining that a suitable designated user input has not been received (i.e., determination block 846="No"), the mobile device may continue to operate in the write-only interaction state in accordance with any of the methods discussed above (e.g., method 800, 820, etc.) in block 842.

In response to determining that a suitable designated user input has been received (i.e., determination block 846="Yes"), the mobile device may exit the write-only interaction state in block 848.

Referring to FIG. 8I, in block 842 of the method 860, the mobile device may operate in the write-only interaction state in accordance with any of the methods 800, 820, or 840 as described. In block 864, the mobile device may restart an inactivity timer after each user input.

In determination block 866, the mobile device may determine whether the inactivity timer satisfies a threshold. Such a threshold may user defined and corresponds to an amount of time consistent with the user being finished entering a note. For example, the threshold may be between 10 seconds and a minute.

In response to determining that the inactivity timer does not satisfy the threshold (i.e., determination block 866="No"), the mobile device may continue to operate the device in the write-only interaction state in block 842, restarting the inactivity timer in block 864 every time a user input is received.

In response to determining that the inactivity timer satisfies the threshold (i.e., determination block 866="Yes"), the mobile device may exit the write-My interaction state in block 848. In other words, once the user has stopped making inputs (e.g., typing, writing with a stylus, etc.) for a period of time (i.e., the threshold) consistent with the user being finished, the mobile device may exit the write-only interaction state, such as returning to the locked-screen mode, for example.

Figure 8E:
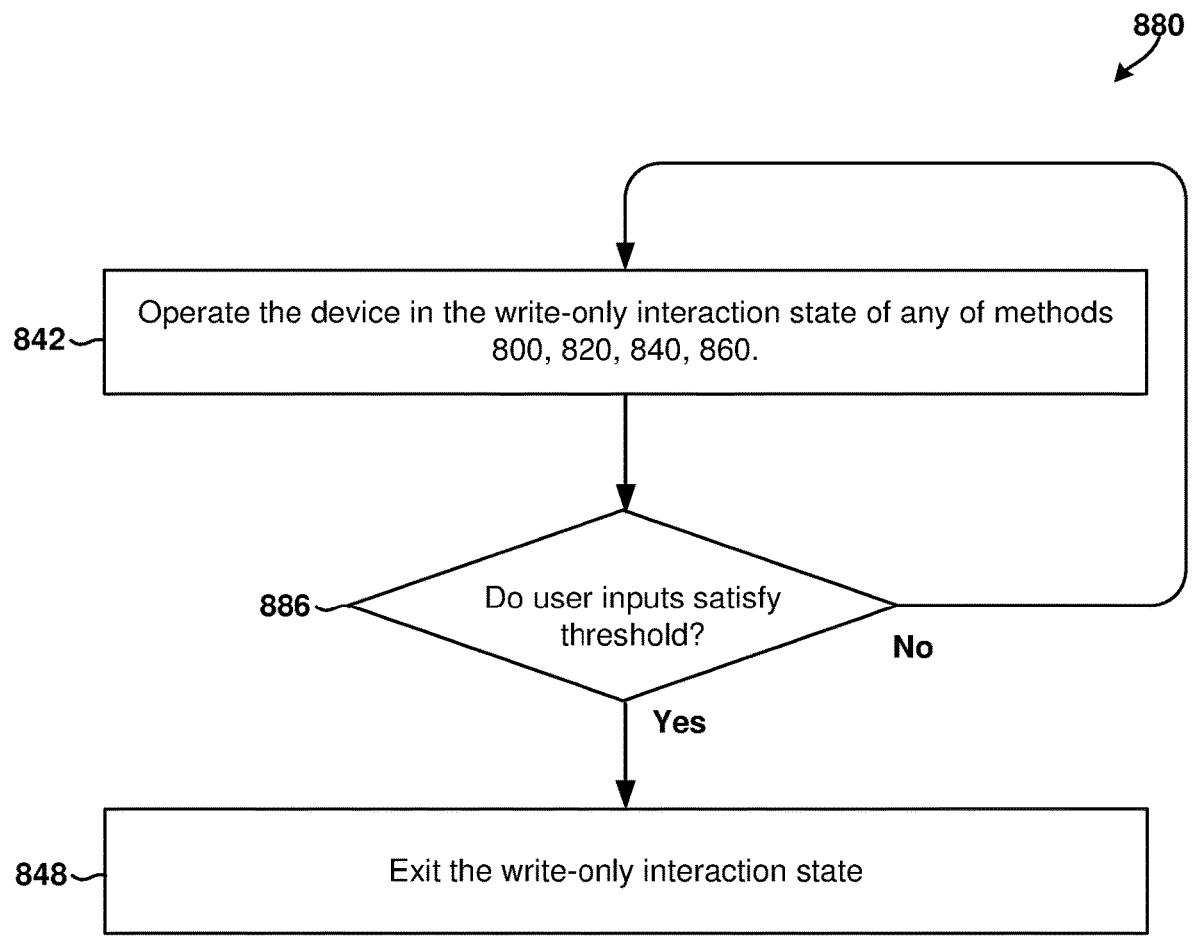

Referring to FIG. 8E, in block 842 of the method 880, the mobile device may operate in the write-only interaction state in accordance with any of the methods 800, 820, 840 or 860 as described. In block 886, the mobile device may determine whether user inputs satisfy a threshold. For example, the threshold may be a maximum number of letters or words for the write-only interaction function. As another example, the threshold may be a maximum time permitted for using the write-only interaction state. Other types of thresholds, as well as the threshold values may be user configurable.

In response to determining that the user inputs do not satisfy the threshold (i.e., determination block 886="No"), the mobile device may continue to operate in the write-only interaction state in block 842.

In response to determining that the user inputs satisfy the threshold (i.e., determination block 886="Yes"), the mobile device may exit the write-only interaction state in block 848.

In some embodiments, the mobile device may be configured to perform operations to authenticate the user while the mobile device operates in the write-only interaction state. For example, the mobile device may display a lock screen and operate in the write-only interaction state, commence rendering user inputs on top of the lock screen in a user input area for a period of time, use the write-only access to store the user inputs in the secure file, perform facial recognition operations (or other similar operations) to authenticate the user while the user continues to prove inputs, unlock the mobile device based on the user authentication, and continue rendering user inputs on top of the lock screen or one top of a subsequent screen for a period of time or until the user ceases inputting information or becomes inactive. The mobile device may store in a single secure file the user inputs of limited information that are received by the mobile device in the write-only interaction state within a predefined duration.

Figure 9A:
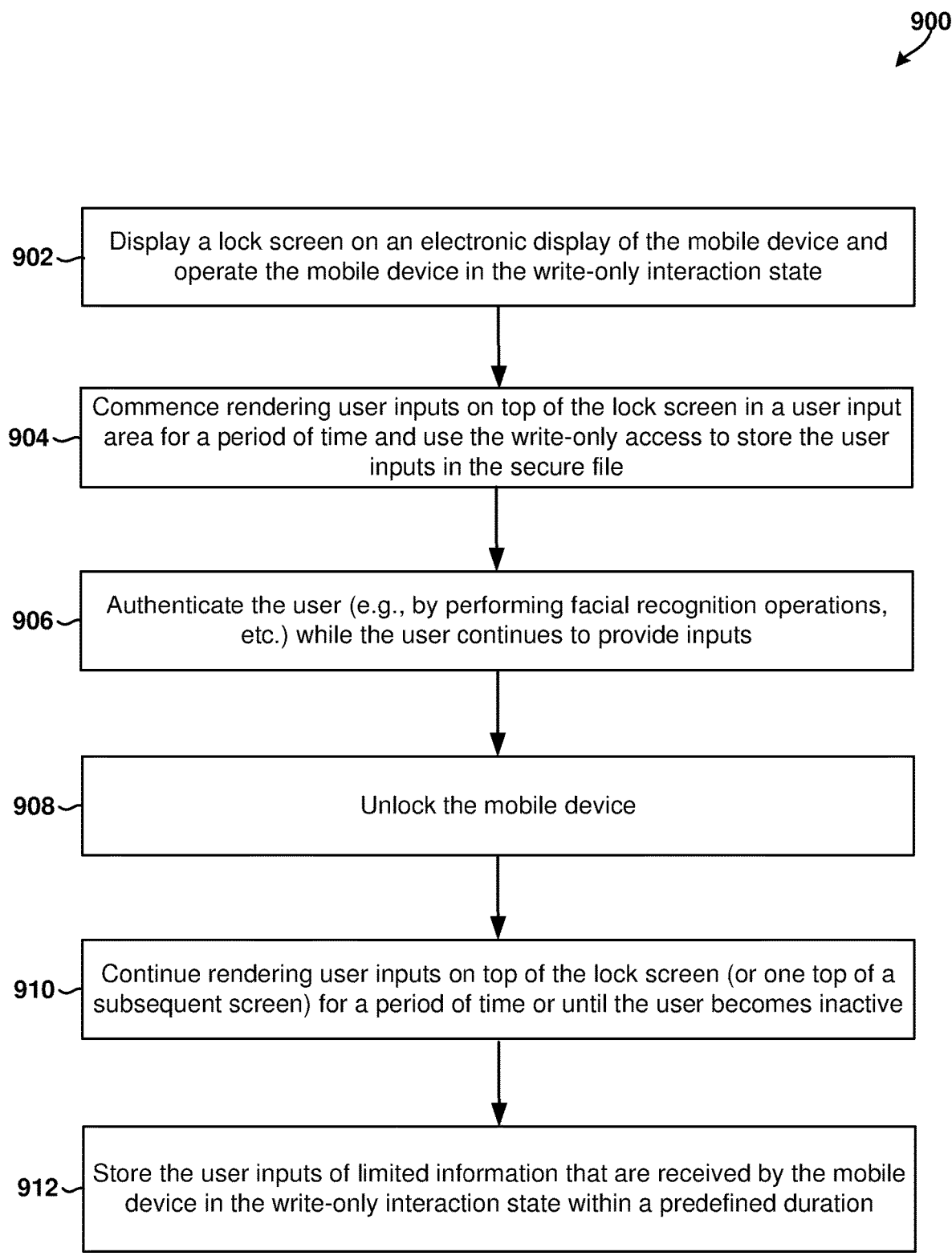
FIGS. 9A and 9B are process flow diagrams illustrating methods of authenticating the user while the mobile device operates in the write-only interaction state in accordance with some embodiments.
Figure 9B:
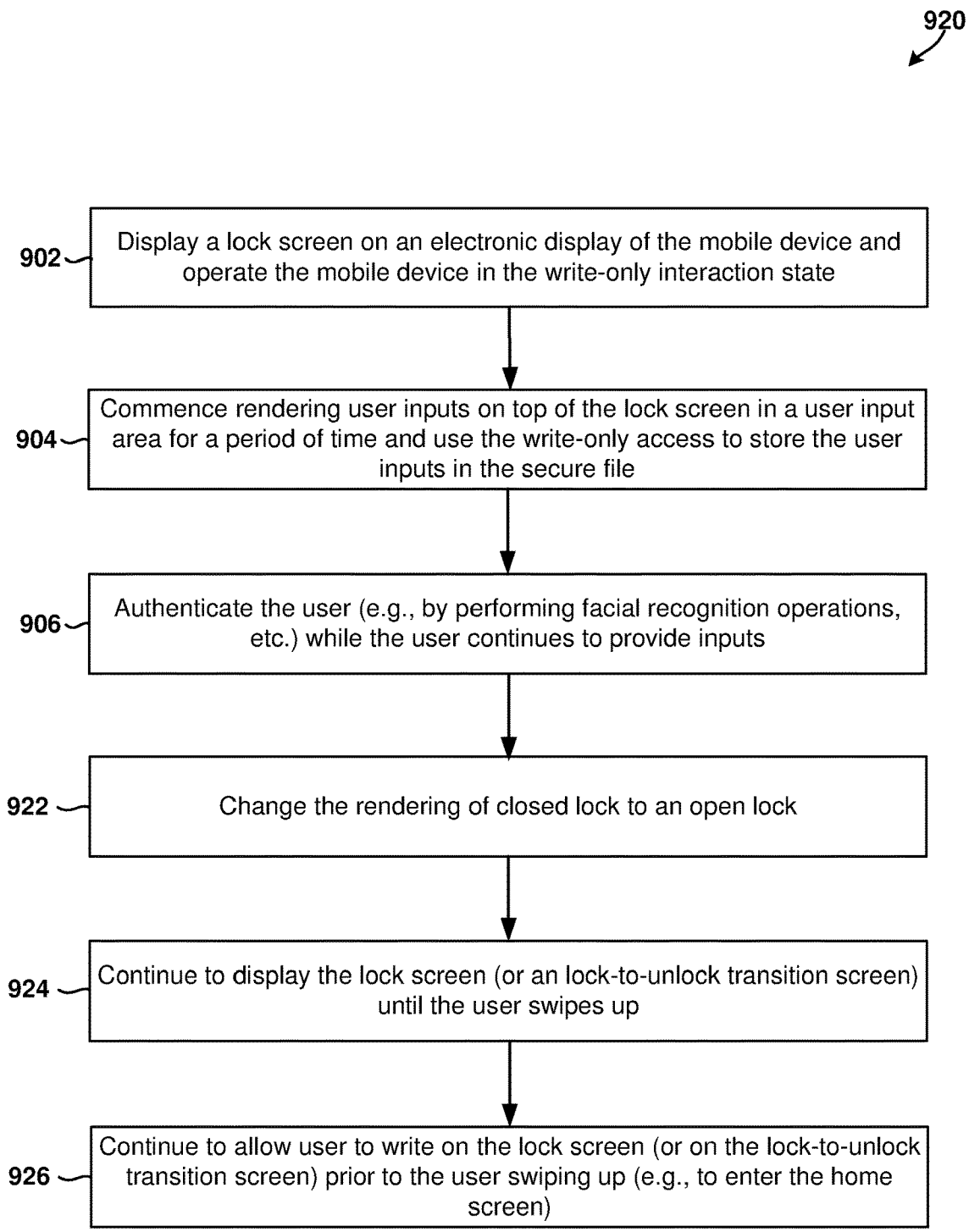

FIGS. 9A and 9B illustrate methods 900, 920 of authenticating the user while the mobile device operates in the write-only interaction state in accordance with some embodiments. With reference to FIGS. 1-9B, the operations of the methods 900, 920 may be performed or implemented in hardware components and/or software components of an mobile device (e.g., mobile device 100, mobile device 202, etc.) the operation of which may be controlled by one or more processors (e.g., the processors 106, 116, etc.).

Referring to FIG. 9A, in block 902 of the method 900, the mobile device may display a lock screen (or other type of screen not associated with a notes application) on an electronic display of the mobile device and operate the mobile device in the write-only interaction state.

In block 904, the mobile device may commence rendering user inputs on top of the lock screen in a user input area for a period of time and use the write-only access to store the user inputs in the secure file.

In block 906, the mobile device may authenticate the user (e.g., by performing facial recognition operations, collecting and analyzing fingerprints, etc.) while the user continues to provide inputs.

In block 908, the mobile device may unlock the mobile device (in response to authenticating the user in block 906), and continue rendering user inputs on top of the lock screen (or one top of a subsequent screen) for a period of time or until the user becomes inactive in block 910.

In block 912, the mobile device may store the user inputs of limited information that are received by the mobile device in the write-only interaction state within a predefined duration.

Referring to FIG. 9B, in blocks 902-906 of the method 920, the mobile device may perform the operations of the like numbered blocks of the method 900 as described. In block 922, the mobile device may change the rendering of closed lock to an open lock, and continue to display the lock screen (or an unlock screen) until the user performs an appropriate input gesture (e.g., swiping up, left or right). In block 924, the mobile device may continue to display the lock screen (or a lock-to-unlock transition screen) until the user performs the appropriate input gesture, like a swipe up or a swipe left or right.

In block 926, the mobile device may continue to allow user to write on the lock screen (or on the lock-to-unlock transition screen) prior to the user performing the appropriate input gesture (e.g., swiping up, left or right to enter the home screen). Thus, a mobile device configured in accordance with some embodiments may enable a user to write on the lock-to-unlock transition screen prior to the user performing the appropriate input gesture (e.g., swiping up, left or right to enter the home screen).

As mentioned above, some screens (e.g., lock screen, home screen, etc.) may display notifications (or a pop-up message or interface that is rendered on top of another screen, etc.) informing the user of an incoming email, text, etc. In some embodiments, the mobile device may be configured to allow a user to write notes or add markups directly to, or on top of, a notification (or pop-up message, etc.). For example, the mobile device may be configured to commence operating in the write-only interaction state and/or render a soft keyboard in response to detecting a user touch on a notification message. The mobile device may capture and render user inputs on top of the notification and use the write-only access to store the user inputs in a mite-taking file. The mobile device may cease receiving and rendering of the user inputs on top of the notification message in response to expiration of the period of time, in response to detecting user inactivity, in response to determining that the notification has been closed, in response to determining that a notification display period has expired, etc. The mobile device may store the user inputs in the note-taking file and/or store the note-taking file in a more permanent file when the user is authenticated and the mobile device exits the screen-locked state (or other screens or states as described herein). The user inputs/files may be stored with or without an association to the notification and/or with or without an association to a software application corresponding to the notification. The mobile device may also use the user inputs or the contents of the note-taking or more permanent file to invoke a feature or functionality on the mobile device. For example, as is described in more detail below, in some embodiments the mobile device may be configured to generate a draft reply email message based on user inputs added directly to, or on top of, a displayed notification, such as an incoming email notification.

In some embodiments, the mobile device may be configured to allow notifications to be selected by a user and for the selected notification to be associated with user inputs received anywhere on the screen (e.g., on top of the notification, below the notification, to the side of the notification, etc.). For example, the mobile device may be configured to commence operating in the write-only interaction state and/or render a soft keyboard in response to determining that the user touched an area on the display screen while a notification was being displayed. The mobile device may render the user inputs in a user input area (e.g., the area on the screen that the user touched, etc.) and/or store the received inputs in a note-taking file. The mobile device may cease receiving, rendering or storing the user inputs in response to detecting de-selection of the notification message, in response to determining that the notification has been closed, in response to determining that a notification display period has expired, in response to expiration of the period of time, in response to detecting user inactivity, etc. The mobile device may store the user inputs in the note-taking file and/or store the note-taking file in a more permanent file that is only accessible when the user is authenticated and the mobile device exits the screen-locked state (or other screens or states as described herein). The mobile device may also use the user inputs or the contents of the note-taking file or the more permanent file to invoke a feature or functionality on the mobile device. For example, as is described in more detail below, in some embodiments the mobile device may be configured to generate a draft reply email message based on user inputs added directly to, or on top of, a displayed notification, such as an incoming email notification.

In some embodiments, the mobile device may be configured to store the user inputs, the note-saving file, or the more permanent file in association with (or so that it references, etc.) the notification message.

In some embodiments, the mobile device may be configured to store the user inputs, the note-saving file, or the more permanent file in association with a software application (e.g., note-taking application, etc.).

In some embodiments, the mobile device may be configured to store the user inputs, the note-saving file, the more permanent file, etc. directly within a software application corresponding to the notification. For example, in response to an email notification, the mobile device may cause a corresponding email software application to generate a draft reply message, populate the body of the draft reply message based on the user inputs or contents of the note-saving file, and store the draft reply message in a "draft" or "saved" mailbox of the email software application. In some embodiments (e.g., embodiments in which the notification is rendered on a lock screen or when the device is in a screen locked state, etc.) the mobile device may store the user inputs or note-saving file (or reply email message, reply text, etc.) in memory until (at least) the device exits the lock screen and/or exists the screen locked state.

In some embodiments, the mobile device may be configured to automatically invoke a feature of a software application corresponding to the notification when the device exits the lock screen or the screen locked state. For example, the mobile device may automatically send a reply email that is generated based on user inputs received on top an email notification when the device exits the lock screen or the screen locked state. As another example, the mobile device may be configured to open the email application and notify the user that the email is ready for review when the device exits the lock screen or the screen locked state. In this example, the email may not be sent until the user opens the email application, retrieves the draft email, and then hits a send button.

In some embodiments, the mobile device may be configured to display a pop-up window or user input dialog box requesting that the user confirm whether a feature of the software application corresponding to the notification or user inputs should be invoked. For example, in response to (or any suitable time after) the device exiting the lock screen or the screen locked state, the mobile device may prompt the user to confirm whether a reply email message generated based on user inputs received on top an email notification message should be sent (and/or whether the email application should be opened). The mobile device may send the reply email in response to the user confirming that email is to be sent. The mobile device may also allow the user to discard or further edit the draft reply email (e.g., in response to the user not confirming that draft email is to be sent, etc.).

In some embodiments, the mobile device may be configured to store the user inputs, the note-saving file, and/or the more permanent file along with context information about the notification or about a software application that corresponds to the notification. For example, the mobile device may store user inputted text along with information such as "Email from John Smith." As another example, the mobile device may store the user inputs along with a screenshot or other representation of the notification (e.g., rendering of the notification or the contents of the notification) that provides the user or a software application with context (e.g., the note was entered in response to a notification that a text message was received from John Smith, etc.).

In some embodiments, the mobile device may allow a user to write or provide inputs on a notification or widget associated with a software application, generate a note-saving file or more permanent file for the associated software application, and/or cause a software application to perform a task or take a responsive action based on the notification or user inputs. For example, in response to receiving an email notification, the mobile device may the mobile device may create a draft email, use a writing intelligence widget and/or the user inputs to populate the draft email with text or content, and cause the software application to store and/or send the draft email.

In some embodiments, the mobile device may be configured to store the user inputs or the note-saving file (or portions of the notification selected by the user) in a paste buffer or clipboard file. A clipboard may be a buffer or portion of memory that is provided by the mobile device's operating system and used for short-term storage and/or to transfer information within and between software application. The mobile device may store the user inputs or the note-saving file in the clipboard in addition to, or in lieu of, more permanent memory. For example, in addition to or in lieu of storing the user inputs in the single secure file, the mobile device may store the user inputs of limited information that are received by the mobile device in the write-only interaction state in the paste buffer or clipboard. In response to determining that the device exited the screen locked state and/or lock screen, the mobile device may provide the user with the option of pasting the contents of the clipboard to the note-taking application (or other associated software application). In some embodiments, each "note" added to the clipboard may replace the last "note" stored in the clipboard. In some embodiments, a clipboard may store multiple notes and functionality may enable the user to later select from among the multiple notes one or more notes to paste into a document or application (e.g., an email application). In some embodiments, the mobile device may be configured to store only the last X clips/notes. In some cases, the oldest stored notes may be replaced as each new note is added after X clips/notes have been saved to the clipboard.

As mentioned above, the mobile device may be configured to allow a user to provide user inputs (e.g., write notes and/or add markups) directly to or on top of a notification, and to use the user inputs to invoke a feature or functionality on the mobile device. In some embodiments, the notifications may be displayed on the lock screen. In other embodiment the notifications (e.g., banners that slide in, pop-up notifications, etc.) may be received while the device is in use (e.g., on the home screen or in another application). Thus, while using the mobile device in a current application when a banner alert notification corresponding to an email appears, a user may write directly on the notification without opening up the application associated with the notification, without bringing up an input interface, and/or without ending or pausing the current application.

That is, in some embodiments, the mobile device may be configured to open a keyboard interface in response to detecting a user input/gesture (e.g., user swipe down, etc.) in relation to certain displayed notifications (e.g., text banner alert). The mobile device may allow a user to respond to the notification (e.g., type a response message, etc.) without necessarily opening a software application corresponding to the notification (e.g., a messaging app corroding to a text banner alert, etc.). In the case where a physical keyboard is connected (e.g., Bluetooth keyboard, built-in keyboard, etc.), the user may respond similarly without necessarily opening a software application corresponding to the notification (e.g., a messaging app corroding to a text banner alert, etc.). In embodiments using writing input, the user may respond similarly without necessarily opening a software application corresponding to the notification (e.g., a messaging app corroding to a text banner alert, etc.). In addition to and independent of these features, a mobile device configured in accordance with some embodiments may allow a user to input information directly on the notification, and to store the user inputs with or without association to the notification or software applications corresponding to the notification.

In some embodiments, the mobile device may be configured to store only the user inputs in the note-saving file or more permanent file (converted or raw text). In some embodiments, the mobile device may be configured to store all or portions of the notification along with the user inputs in the note-saving file or more permanent file. Storing all or portions of the notification may provide the user with a context for the user inputs stored in the note-saying file, thus enabling user to take very brief or cryptic notes (e.g., "no" or "yes") and later to recall what was intended based on the context provided by the notification that prompted the brief user note.

In some embodiments, the mobile device may be configured to highlight or annotate notifications. For example, the mobile device may be configured to allow a user to underline or highlight certain words in an email/text notification or other notification, storing the underlined or highlight port of the notification. This may allow the user to later review the not and focus on the annotations.

In some embodiments, the mobile device may be configured to use the annotations to cause or invoke a corresponding action. For example, if a mobile device user receives a notification that he has a meeting at 1:00 PM, he may write "2:30" right on the notification to cause the mobile device to take actions automatically to change the meeting time, such as changing the appointment time in a calendar application, notifying other participants (e.g., via an email application), etc. As another example, a mobile device user may write on the notification: "Will be 10 minutes late," which may cause the mobile device to send a message with those words (e.g., in textual form and/or in writing) to other meeting participant(s). In various embodiments, the message that is sent may be converted or translated into other text. For example, the message may instead say "Arriving in 10 minutes" or translated to a different language appropriate for the recipient (one of the meeting participants) of the message.

As mentioned above, the mobile device may be configured to store the user inputs in the note-taking file and/or store the note-taking file in a more permanent file when the user is authenticated and the mobile device exits the screen-locked state (or other screens or states as described herein). As also mentioned above, the user inputs/files may be stored with or without an association to the notification and/or with or without an association with a software application corresponding to the notification. In some embodiments, the user inputs/files may be stored in association with a software application that does not corresponding directly to the notification. For example, the mobile device may be configured to display a notification (e.g., a banner alert) of an incoming call, commence operating in the write-only interaction state and/or render a soft keyboard in response to detecting a user touch on the notification, and receive and render user inputs (e.g., "can't talk now," "call you in a bit," etc.) on top of the notification. The user inputs may be converted text and/or raw input (e.g., an image showing what was written), which may be captured and saved as discussed in this application. In some embodiments, the mobile device may allow the user to write directing on an incoming call screen.

In some embodiments, the mobile device may be configured to store as user inputs all or portions of text/information included in a notification (e.g., text in an email notification), such as in a manner similar to a copy-paste functionality. The mobile device may store the "copied" text in the above described clipboard.

Figure 10:
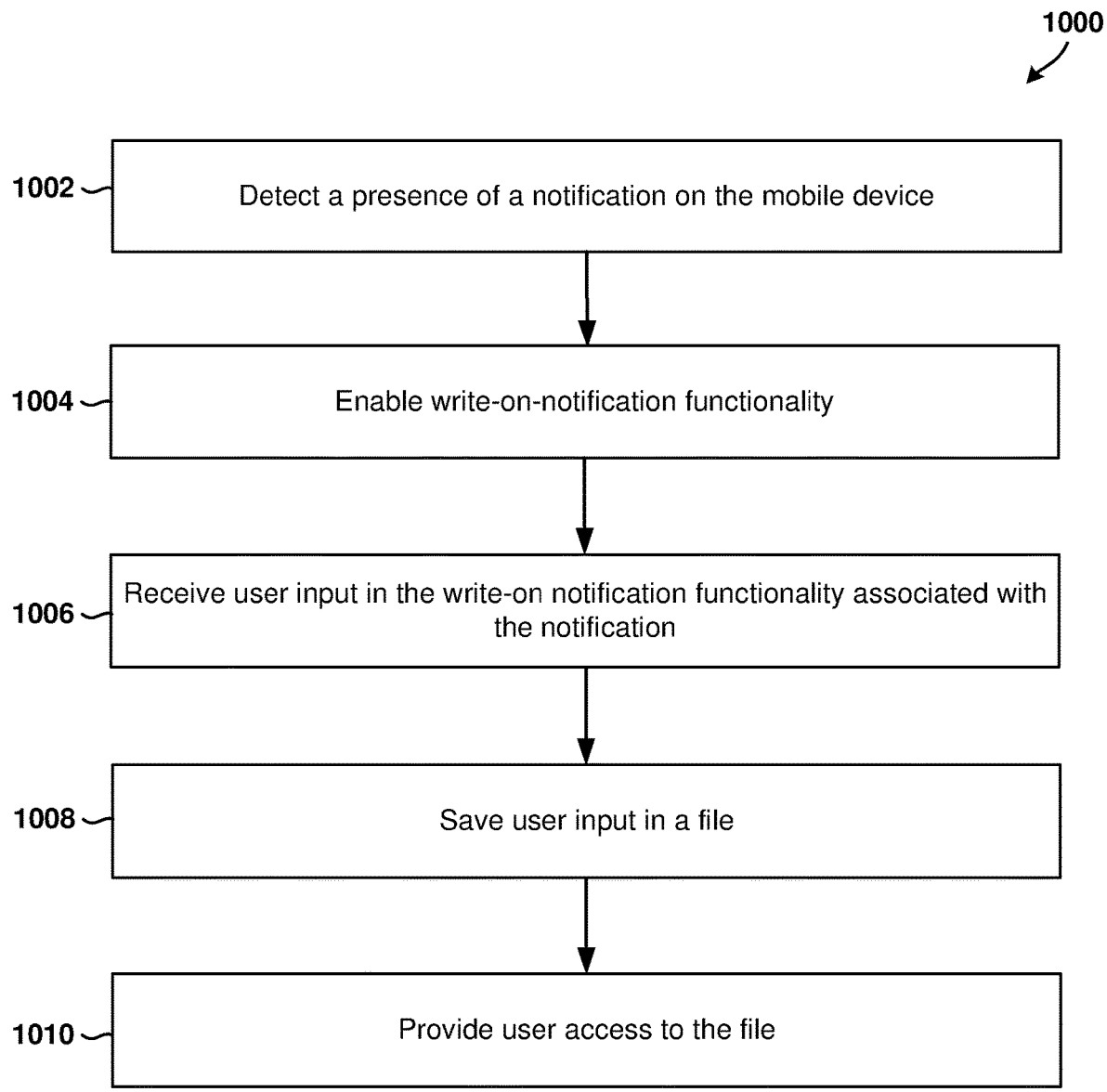
FIG. 10 is a process flow diagram illustrating a method of capturing a note on an announcement rendered on a screen in accordance with some embodiments.

FIG. 10 illustrates a method 100 of capturing a note on or associated with a notification message (e.g., a banner) and saving the user inputs or notes with the notification message or an application associated with the notification in accordance with some embodiments. With reference to FIGS. 1-10, the operations of the method 1000 may be performed or implemented in hardware components and/or software components of an mobile device (e.g., mobile device 100, mobile device 202, etc.) the operation of which may be controlled by one or more processors (e.g., the processors 106, 116, etc.).

In block 1002 of the method 1000, the mobile device may detect a presence of a notification on the mobile device, such as on a screen (e.g., lock screen, home screen, etc.) and/or on an electronic display of the mobile device. As an example, if an application running in the background generates an announcement banner that is rendered on top of the screen rendered by the active application, this event may be detected by the mobile device. In some embodiments, detecting a presence of a notification may include detecting an audible notification.

In block 1004, the mobile device may enable write-on-notification functionality to enable the user to provide ail input (e.g., a note or highlight) relating to the notification. In some embodiments, the write-on-notification functionality may be active before the notification is detected, and function to enable the user to provide an input related to the notification. In some embodiments, the write-on-notification functionality may be active in the background before the notification is detected, and in response to the detection in block 1002, may be presented in the foreground to enable the user to provide an input related to the notification. In some embodiments, the write-on-notification functionality may be inactive before the notification is detected, and in response to the detection in block 1002, the mobile device may activate the functionality to enable the user to provide an input related to the notification. In some embodiments, the write-on-notification functionality may be associated with the application that is generating the notification, and provide the user with the ability to make inputs on or regarding the notification as part of generating the notification. In some embodiments, the write-on-notification functionality may be separate from the application that generated the notification (i.e., a different software application) but triggered or activated by the application when generating the notification. In some embodiments, the file may be associated with a different application than the application currently being used (e.g., when the notification appears in a display screen of a first application). In some embodiments, activating the write-on-notification functionality may include activating an instant type function and/or rendering a soft keyboard, which may include rendering an input window on or near the announcement. In some embodiments, the write-on-notification functionality may be a subset of the functionality available/provided when the mobile device operates in the write-only interaction state, which as discussed above, provides write-only access to a secure file on the mobile device and enables a user to enter limited information that is stored in the secure file. In some embodiments, the write-on-notification functionality may be independent, separate or distinct from the write-only interaction state discussed above.

In block 1006, the mobile device may receive user input. In some embodiments, the write-on-notification functionality may be configured to receive a user input from an electronic pen or stylus. For example, the write-on-notification functionality may enable the user to write a note, make a mark, cross-out or underline a portion of a notification rendered on an electronic display using an electronic pen or stylus. In some embodiments, the write-on-notification functionality may render a keypad for entering text, receive text inputs from the user on the rendered keypad, and render the inputs as entered at a location on the screen, such as on or near the notification or in a location indicated or touched by the user. The user inputs may also be audio recordings or voice inputs received via the microphone, or any of the other forms of user inputs discussed in this application.

In block 1008, the mobile device may save the received user input in a file or other file or memory system. In some embodiments, the file may be associated with the notification, in some embodiments, the file may be associated with the application (e.g., stored as a file in that application or application folder) that generated the notification. For example, the mobile device may save the user inputs in a file that can be accessed by an email application when the announcement was a banner indicating that an email was received, thus enabling the user to refer to or edit the stored input upon activating the email application. As another example, the mobile device may save a user input in a file that is accessible in a calendar application when the notification is generated by the calendar application. As another example, the mobile device may save a user input in a note-taking file, more permanent file, clipboard, or any other file or memory system when the announcement is associated with an application or functionality that does not receive user inputs, such as a news feed application.

In block 1010, the mobile device may provide user access to the file, in some embodiments, the mobile device may provide user access to the file upon activation of an application associated with the notification. For example, the mobile device may provide user access to the file upon activation of a note taking application, email application, etc. when the user begins using the application or functionality that was associated with the notification that was detected in block 1002. In some embodiments, the mobile device may provide user access to the file upon activation of a note-taking or word processor application. In some embodiments, the mobile device may provide user access to the file in response to authentication of the user and/or the mobile device being unlocked. In some embodiments, the mobile device may provide user access to the file in response to presentation of a particular screen on the display, such as a home screen, a presentation of previously rendered notifications (which may be presented over a home screen), a home screen of a particular application, etc.

Figure 11:
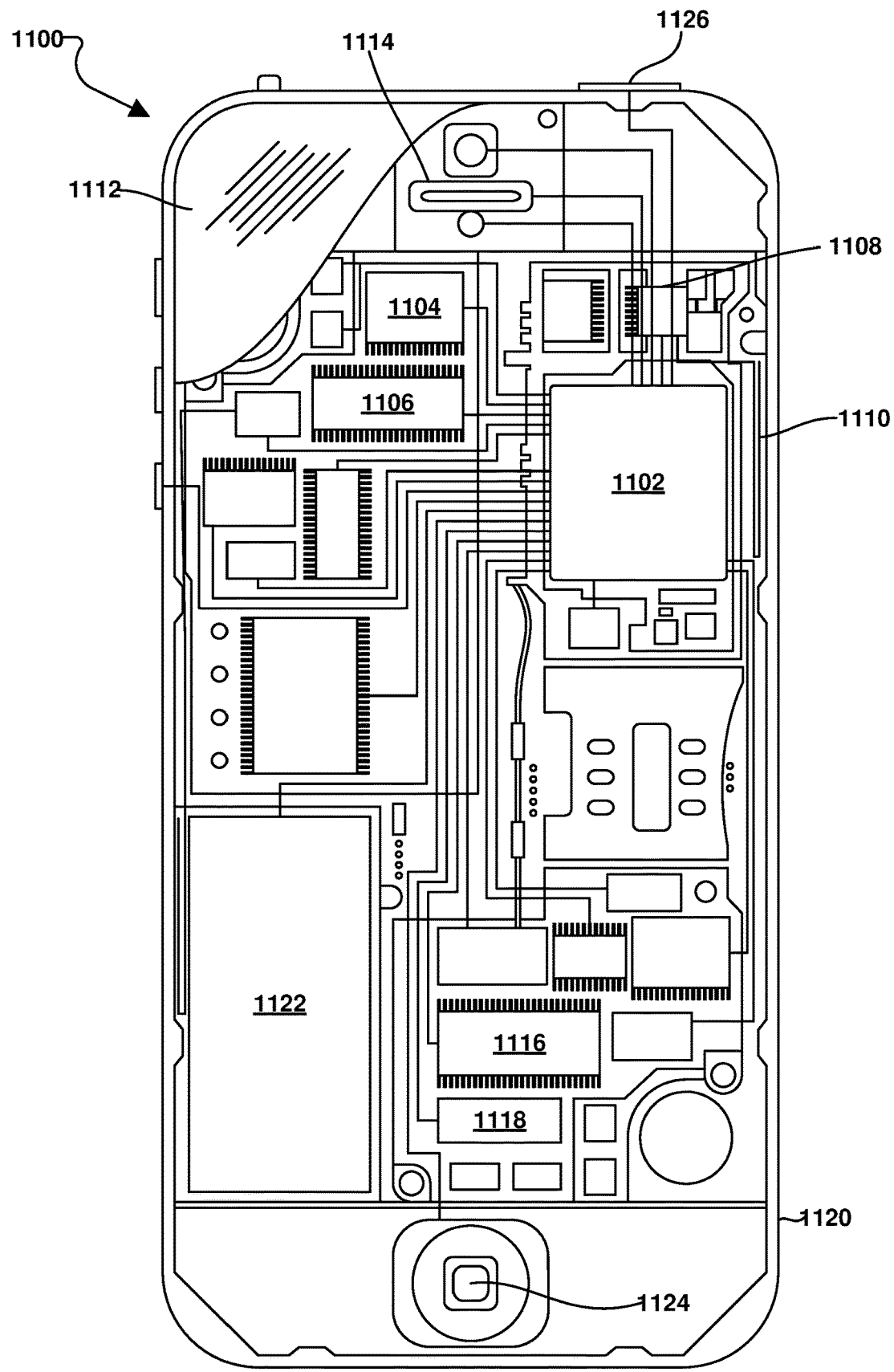
FIG. 11 is a component block diagram illustrating a mobile device suitable for implementing some embodiments.

Various embodiments (including, but not limited to, embodiments described above with reference to FIGS. 1-10) may be implemented in a wide variety of mobile devices including wireless communication devices, an example of which suitable for use with various embodiments is illustrated in FIG. 11. The mobile device 1100 may include a processor 1102 coupled to a touchscreen controller 1104 and an internal memory 1106. The processor 1102 may be one or more multicore integrated circuits designated for general or specific processing tasks. The internal memory 1106 may be volatile or non-volatile memory and may also be secure and/or encrypted memory, or unsecure and/or unencrypted memory, or any combination thereof. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the computing device 1100 need not have touch screen capability.

The mobile device 1100 may have one or more radio signal transceivers 1108 (e.g., Peanut, Bluetooth, ZigBee, RF radio) and antennae 1110, for sending and receiving communications, coupled to each other and/or to the processor 1102. The transceivers 1108 and antennae 1110 may be used with the above-mentioned circuitry to implement the various wireless transmission protocol stacks and interfaces. The mobile device 1100 may include a cellular network wireless modem chip 1116 that enables communication via a cellular network and is coupled to the processor.

The mobile device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as Universal Serial Bus (USB), FireWire, Thunderbolt, or PCIe. The peripheral device connection interface 1118 may also be coupled to a similarly configured peripheral device connection port (not shown).

The mobile device 1100 may also include speakers 1114 for providing audio outputs. The mobile device 1100 may also include a housing 1120, constructed of a plastic, metal, or a combination of materials, for containing all or some of the components described herein. The mobile device 1100 may include a power source 1122 coupled to the processor 1102, such as a disposable or rechargeable battery. The rechargeable battery may also be coupled to the peripheral device connection port to receive a charging current from a source external to the wireless communication device 1100. The mobile device 1100 may also include a physical button 1124 for receiving user inputs. The mobile device 1100 may also include a power button 1126 for taming the mobile device 1100 on and off.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a mobile device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different types of memories and memory technologies are available or contemplated in the future, any or all of which may be included and used in systems and mobile devices that implement various embodiments. Such memory technologies/types may include non-volatile random-access memories (NVRAM) such as Magnetoresistive RAM (M-RAM), resistive random access memory (ReRAM or RRAM), phase-change random-access memory (PRAM, PC-RAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (EPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and mobile devices that implement various embodiments may also include or use electronic (solid-state) non-volatile computer storage mediums, such as FLASH memory. Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language.

Computer program code or "program code" for execution on a programmable processor for carrying out operations of various embodiments may be written in a high level programming language such as C, C++, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order, Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with various embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, hut, in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration. Such components may be included in a system-on-chip (SOC) or in a system-in-package (SIP). Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (MD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to various embodiments and implementations described herein, but is to be accorded the widest scope consistent with the following claims and the principles and novel features disclosed herein.

What is claimed is:
1. A method of capturing notes on a mobile device, comprising:
displaying a lock screen on an electronic display of the mobile device and operating the mobile device in a write-only interaction state that provides write-only access to a secure file on the mobile device and that enables a user to enter information that is stored in the secure file;

rendering user inputs on top of the lock screen in a user input area and using the write-only access to store the user inputs in the secure file;

storing in the secure file the user inputs of the information that are received by the mobile device in the write-only interaction state; and initiating user authentication operations in response to determining that a number of user inputs received and rendered on top of the lock screen satisfies a threshold amount.

2. The method of claim 1, further comprising:
storing contents of the secure file in association with a note-taking application operating on the mobile device in response to the mobile device authenticating the user.

3. The method of claim 2, further comprising:
preventing the user from viewing, accessing, deleting, or editing the secure file until the mobile device authenticates the user.

4. The method of claim 1, further comprising:
monitoring sensors of the mobile device to determine whether a user has picked up or is otherwise attempting to interact with the mobile device while in a lock screen mode; and
displaying the lock screen and operating the mobile device in the write-only interaction state in response to the mobile device determining that the user has picked up or is otherwise attempting to interact with the mobile device.

5. The method of claim 4, further comprising rendering a keypad on the electronic display of the mobile device in response to determining that the user has picked up or is otherwise attempting to interact with the mobile device.

6. The method of claim 5, wherein rendering the user inputs on top of the lock screen in the user input area for the period of time and using the write-only access to store the user inputs in the secure file comprises rendering text inputs by the user on the rendered keypad at a location on the lock screen first touched by the user.

7. The method of claim 1, further comprising:
storing contents of a plurality of single secure files in a note-taking application operating on the mobile device; and
autonomously organizing the plurality of single secure files locally on the mobile device or remotely via a cloud or communication network.

8. The method for claim 1, further comprising authenticating the user while continuing to render user inputs on top of the lock screen.

9. The method of claim 8, further comprising unlocking the mobile device based on authenticating the user.

10. A mobile device, comprising:
a display; and
a processor coupled to the display and configured with processor-executable instructions to:
display a lock screen on the display of the mobile device and operate the mobile device in a write-only interaction state that provides write-only access to a secure file on the mobile device and that that enables a user to enter information that is stored in the secure file;
render user inputs on top of the lock screen in a user input area and using the write-only access to store the user inputs in the secure file;
store in the secure file the user inputs of the information that are received by the mobile device in the write-only interaction state; and
initiate user authentication operations in response to determining that a number of user inputs received and rendered on top of the lock screen satisfies a threshold amount.

11. The mobile device of claim 10, wherein the processor is further configured with processor-executable instructions to:
store contents of the secure file in association with a note-taking application operating on the mobile device in response to the mobile device authenticating the user.

12. The mobile device of claim 11, wherein the processor is further configured with processor-executable instructions to:
prevent the user from viewing, accessing, deleting, or editing the secure file until the mobile device authenticates the user.

13. The mobile device of claim 10, wherein the processor is further configured with processor-executable instructions to:
monitor sensors of the mobile device to determine whether a user has picked up or is otherwise attempting to interact with the mobile device while in a lock screen mode; and
display the lock screen and operate the mobile device in the write-only interaction state in response to the mobile device determining that the user has picked up or is otherwise attempting to interact with the mobile device.

14. The mobile device of claim 13, wherein the processor is further configured with processor-executable instructions to render a keypad on the electronic display of the mobile device in response to determining that the user has picked up or is otherwise attempting to interact with the mobile device.

15. The mobile device of claim 14, wherein the processor is further configured with processor-executable instructions to render the user inputs on top of the lock screen in the user input area for the period of time and using the write-only access to store the user inputs in the secure file by rendering text inputs by the user on the rendered keypad at a location on the lock screen first touched by the user.

16. The mobile device of claim 10, wherein the processor is further configured with processor-executable instructions to:
store contents of a plurality of single secure files in a note-taking application operating on the mobile device; and
autonomously organize the plurality of single secure files locally on the mobile device or remotely via a cloud or communication network.

17. The mobile device of claim 10, wherein the processor is further configured with processor-executable instructions to authenticate the user while continuing to render user inputs on top of the lock screen.

18. The mobile device of claim 17, wherein the processor is further configured with processor-executable instructions to unlock the mobile device based on authenticating the user.

19. A mobile device, comprising:
means for displaying a lock screen;
means for operating the mobile device in a write-only interaction state that provides write-only access to a secure file on the mobile device and that that enables a user to enter information that is stored in the secure file;

means for rendering user inputs on top of the lock screen in a user input area;

means for using the write-only access to store the user inputs in the secure file;

means for storing in the secure file the user inputs of the information that are received by the mobile device in the write-only interaction state; and means for initiating user authentication operations in response to determining that a number of user inputs received and rendered on top of the lock screen satisfies a threshold amount.

20. The mobile device of claim 19, further comprising:

means for storing contents of the secure file in association with a note-taking application operating on the mobile device in response to the mobile device authenticating the user.

21. The mobile device of claim 20, further comprising:

means for preventing the user from viewing, accessing, deleting, or editing the secure file until the mobile device authenticates the user.

22. The mobile device of claim 19, further comprising:

means for monitoring sensors of the mobile device to determine whether a user has picked up or is otherwise attempting to interact with the mobile device while in a lock screen mode;

means for displaying the lock screen; and means for operating the mobile device in a write-only interaction state in response to the mobile device determining that the user has picked up or is otherwise attempting to interact with the mobile device.

23. The mobile device of claim 22, further comprising means for rendering a keypad on the electronic display of the mobile device in response to determining that the user has picked up or is otherwise attempting to interact with the mobile device.

24. The mobile device of claim 23, wherein means for rendering the user inputs on top of the lock screen in the user input area for the period of time and using the write-only access to store the user inputs in the secure file comprises means for rendering text inputs by the user on the rendered keypad at a location on the lock screen first touched by the user.

25. The mobile device of claim 19, further comprising:

means for storing contents of a plurality of single secure files in a note-taking application operating on the mobile device; and means for autonomously organizing the plurality of single secure files locally on the mobile device or remotely via a cloud or communication network.

26. The mobile device of claim 19, further comprising means for authenticating the user while continuing to render user inputs on top of the lock screen.

27. The mobile device of claim 26, further comprising means for unlocking the mobile device based on authenticating the user.

* * * * *